INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

COMPUTER CIRCUITS FOR PROCESSING TRIGONOMETRIC DATA

Filed March 20, 1964

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

INVENTORS
JOHN B. HEAVISIDE
FRANKLIN W. SMITH Jr.
BY
MORGAN, FINNEGAN, DURHAM & PINE
ATTORNEYS

Feb. 3, 1970 J. B. HEAVISIDE ET AL 3,493,735

COMPUTER CIRCUITS FOR PROCESSING TRIGONOMETRIC DATA

Filed March 20, 1964 15 Sheets-Sheet 15

INVENTORS
JOHN B. HEAVISIDE
FRANKLIN W. SMITH Jr.
BY
MORGAN, FINNEGAN, DURHAM & PINE
ATTORNEYS

United States Patent Office 3,493,735

Patented Feb. 3, 1970

3,493,735
COMPUTER CIRCUITS FOR PROCESSING TRIGONOMETRIC DATA

John B. Heaviside, Northport, and Franklin W. Smith, Jr., Port Jefferson Station, N.Y., assignors to North Atlantic Industries, Inc., Long Island City, N.Y., a body corporate of New York Filed Mar. 20, 1964, Ser. No. 353,558
Int. Cl. G06g *7/00, 7/48, 7/22*
U.S. Cl. 235—179 64 Claims

ABSTRACT OF THE DISCLOSURE

Computer circuits for processing trigonometric data are disclosed herein and include synchro/resolver converters, bridges and simulators; static transformer circuits for selectively converting synchro data to resolver data and vice versa are described together with manual and automatic bridge arrangements. Special nondecimal dividers and *a* to *d* and *d* to *a* conversion are also disclosed.

This invention relates to techniques for the processing of data and is particularly but not exclusively concerned with techniques for the measurement, generation and other processing of data related to functions of angles including trigonometric functions.

The invention is further related to novel components and techniques, and combinations thereof, which in the illustrated embodiments are applied to the conversion of synchro data to resolver data and vice versa, to the formation of ratios, to the measurement of trigonometric data, to function generation, to digital/analog and analog digital translation, and to combinations of these and related functions.

It is an object of the invention to provide methods and means for effecting these functions with both precision and economy. Further objects are to provide versatility whereby data in a variety of forms may be processed with a minimum number of components, and to provide a high order of accuracy, e.g., accuracy to one part per million, without a concomitant increase in complexity.

Other objects and advantages of the invention will be set forth in part hereinafter and in part will be obvious herefrom, or may be learned by practice with the invention, the same being realized and attained by means of the instrumentalities and combinations pointed out in the appended claims.

Serving to illustrate exemplary embodiments of the invention are the drawings of which:

FIGURE 1 is a schematic block diagram illustrating a bridge configuration for the measurement of angular data;

FIGURES 2A through 2E inclusive are schematic diagrams of form converters for converting synchro type data to resolver data and vice versa;

GENERAL

The data processing systems according to the invention include means for computing angular data from signals representing vector quantities. Typically, such signals are of analog form and are provided by synchro or resolver equipment; the data are thus represented in synchro or resolver form.

Figure 1:
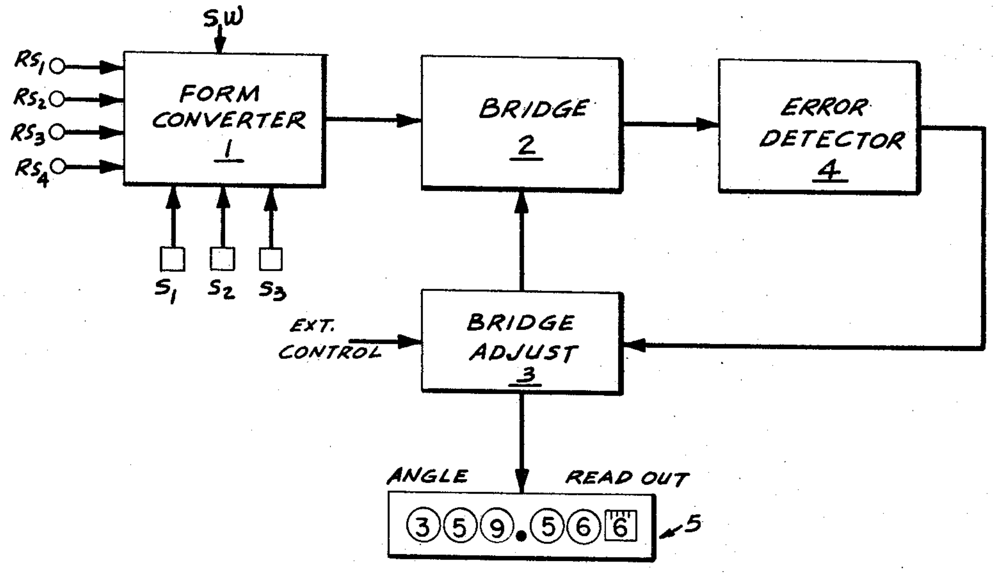

A bridge system for computing the angle represented by a set of synchro or resolver voltages is shown in FIGURE 1. Resolver voltages are applied across terminals $RS_1$, $RS_2$ and $RS_3$, $RS_4$ of a form converter/isolator 1. These complementary voltages may be characterized by the general form $E \sin \theta$ and $E \cos \theta$, respectively. Alternatively, synchro voltages may be applied to the converter across terminals $S_1$, $S_2$ and $S_3$. These complementary voltages, as applied across the terminal pairs, may be characterized by the general form $E \sin \theta$, $E \sin [\theta+120°]$, and $E \sin [\theta+240°]$.

As described more fully hereinafter the form converter is provided with switching means for selecting a mode of operation which depends upon whether the input constitutes synchro voltages or resolver voltages. The output of the form converter is supplied to a bridge circuit 2 which may be illustratively a resolver bridge or synchro bridge. In those arrangements where the bridge is of the resolver type then the form converter 1 is operative to convert synchro voltages into equivalent resolver type voltages for application to the bridge. Isolation of the bridge from the input system is concurrently provided.

With resolver type voltages applied to the form converter of the above example, the converter is switched in such a manner as to provide isolation alone since the conversion function is not required. In this manner both synchro and resolver data may be processed, with isolation jointly provided.

In the event that the bridge 2 is of the synchro type then the form converter is of a configuration which converts resolver data to equivalent synchro data so that the bridge may compute the angle of the input for both resolver and synchro inputs. Hence, irrespective of the type of bridge involved, when used with the appropriate form converter, the combination is capable of processing both synchro and resolver data.

The bridge circuit 2 is adjusted by an appropriate control system 3 which may be manual or operated by suitable signals from an external point. For example, the bridge may be adjusted via a program system e.g., to receive command angle data as symbolized by "Ext. control." In the case of manual adjustment a null detector 4 which is fed from the bridge output is observed and when the null condition is achieved the bridge adjustment is read on indicator 5. The angle thus indicated represents the value of the input data angle $\theta$ represented in either the synchro or resolver inputs. Although the computed and displayed angle is illustrated in degrees and decimal fractions thereof, provision may be made as described more fully hereinafter for computing and displaying the angle in terms of degrees, minutes and seconds or fractions of minutes or in any other angular dimensional units.

For automatic operation, the bridge adjustment system 3 includes a control arrangement responsive to the output of the error detector 4 and adapted to automatically adjust the bridge to achieve a null, e.g., by a suitable scanning and switching combination. The bridge switching circuits may be of the type involving binary coded configurations in which the turns ratios of inductive dividers are varied by suitable switching.

Other functions according to the invention are concerned with generating angle-representing or vector data which illustratively are in resolver or synchro form. Since this function generation is analogous to the operation of synchro and resolver equipment, some components of the arrangements are sometimes referred to as simulators. The term "standards" is also frequently used. A system involving these functions is shown in FIGURE 4.

Figure 4:
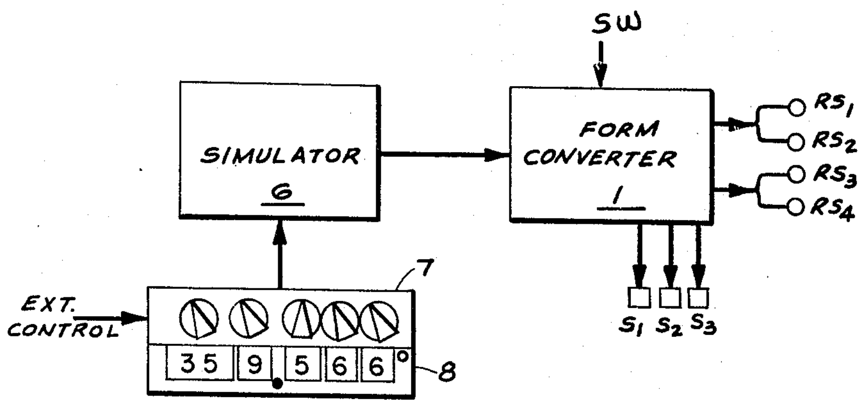
FIGURE 4 is a schematic block diagram of a simulator arragement for generating signals as a function of angular input data.

In the arrangement of FIGURE 4 a simulator 6 is adjusted manually or remotely by an adjustment arrangement 7 which sets the simulator at the desired angle. The angle may be displayed on read-out indicator 8. The displayed angle may be as shown or may have other dimensions as noted in connection with FIGURE 1.

The simulator generates voltages in accordance with the angle to which it is set and these voltages are supplied to form converter 1. The converter also provides isolation and may be switched, as noted in connection with FIGURE 1, between an isolating mode and an isolating/converter mode, depending upon the type of simulator employed. Where the simulator is of the synchro type then the converter is of the type which converts synchro data to resolver data. Hence, either resolver or synchro functions may be generated. Similarly, where the simulator is of the resolver type then the converter is configured to provide resolver-to-synchro conversion so that with mode switching, both synchro and resolver function generation is attained. Resolver voltages are developed at output terminals $RS_1$, $RS_2$, and $RS_3$, $RS_4$; the synchro voltages appear at terminals $S_1$, $S_2$ and $S_3$.

FORM CONVERTERS

Exemplary form converters are shown in FIGURES 2A through 2E. All of the illustrated embodiments have a bilateral characteristic, i.e., they are capable of converting sycnhro type data to resolver type data and vice versa. They are also adapted for switching as more specifically described hereinafter to provide isolating functions alternatively to conversion and isolation.

Figure 2C:
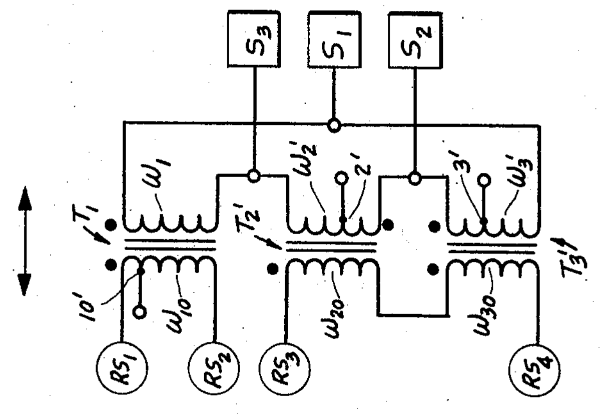
Figure 2B:
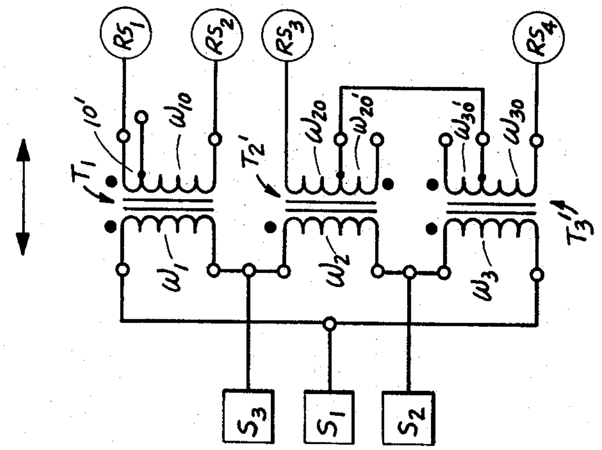
Figure 2A:
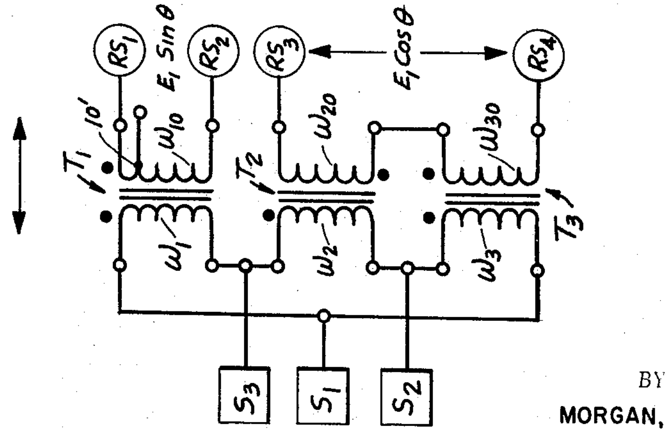

Referring to FIGURE 2A, the application of synchro data [$E \sin \theta$, $E \sin (\theta+120°)$, and $E \sin (\theta+240°)$] at synchro terminals $S_1$, $S_2$ and $S_3$ results in the appearance of the equivalent resolver data at resolver terminals $RS_1$, $RS_2$ [where $E_1 \sin \theta$ appears], and $RS_3$, $RS_4$ [where $E_1 \cos \theta$ appears].

The converse operation transforming resolver inputs to synchro outputs is also available as indicated by the double headed arrow.

The converter of FIGURE 2A comprises three transformers $T_1$, $T_2$ and $T_3$ having windings $W_1$, $W_2$ and $W_3$, respectively, on the synchro side; these windings are interconnected in delta configuration with synchro terminals $S_1$, $S_2$ and $S_3$. Transformers $T_1$, $T_2$ and $T_3$ also have respective resolver windings $W_{10}$, $W_{20}$ and $W_{30}$.

On the synchro side, terminal $S_1$ is connected to $W_1$ and $W_3$; $S_2$ is connected to $W_2$ and $W_3$; and $S_3$ is connected to $W_1$ and $W_2$.

The voltage induced in $W_{10}$ of $T_1$ from $W_1$ yields resolver voltage $E_1 \sin \theta$ at terminals $RS_1$ and $RS_2$. Resolver windings $W_{20}$ and $W_{30}$ are connected in series-opposition to develop the cosine function, $E_1 \cos \theta$; this voltage appears across terminals $RS_3$ and $RS_4$.

When the arrangement of FIGURE 2A is operated either to convert synchro data to resolver data or vice versa, the turns ratios are as follows:

$$W_1/W_{10}=K/1$$

$$W_2/W_{20}=K/(\sqrt{3/3})$$

$$W_3/W_{30}=K/(\sqrt{3/3})$$

K may have any desired value, and windings may be adjusted or tapped as required for the isolation of either synchro or resolver data. For example, $W_{10}$ may be tapped at 10' to yield three identical transformation ratios for synchro isolation.

From the foregoing and with particular values of K assigned, the relationship between the argument E of the synchro data and $E_1$ of the resolver data may be evaluated. The foregoing ratios can be shown to be the result of projecting cartesian coordinate data characterizing resolver voltages on the synchro axis which are separated by 120° intervals, and by the reverse operation.

It may be noted that the arrangement of FIGURE 2A includes two identical transformers $T_2$ and $T_3$. These transformers may thus serve effectively as isolation transformers. As will be shown, the resultant isolation function is particularly useful in connection with the resolver bridges described hereinafter.

In addition to the foregoing, the circuit of FIGURE 2A may be implemented with three identical synchro windings facilitating balanced impedance conditions. Moreover, the turns ratios are not substantially different thus facilitating overall symmetry in impedance conditions. The delta configuration of the synchro windings when contrasted with a Y connection provides a measure of independence from the effects of adverse voltage division due to lack of exact similarity among the three synchro windings. For this reason delta connections are particularly suitable in bridge applications.

To facilitate the isolation function in certain applications, windings $W_{20}$ and $W_{30}$ may be provided with additional sections $W_{20}'$ and $W_{30}'$ as seen in FIGURE 2B. As noted more fully hereinafter these additional winding sections may be utilized for providing isolation when the converter is switched out of the conversion mode. For typical applications the turns ratios in the arrangement of FIGURE 2B are as follows:

$$W_1/W_{10}=K/1$$

$$W_2/W_{20}=K/(\sqrt{3/3})$$

$$W_2/(W_{20}+W_{20}')=K/1$$

$$W_3/W_{30}=K/(\sqrt{3/3})$$

$$W_3/(W_{30}+W_{30}')=K/1$$

The above ratios are applicable for either synchro-to-resolver conversion or the converse.

FIGURE 2C illustrates the arrangement of FIGURE 2A [with the synchro and resolver windings shown in interchanged locations] and wherein the synchro windings $W_2$ and $W_3$ are provided with taps at 2' and 3', respectively, such that sections $W_2'$ and $W_3'$ have turns ratios with respect to $W_{20}$ and $W_{30}$ of 1:K. This arrangement facilitates the switching between form conversion and isolation in certain applications. Apart from the foregoing the circuit of FIGURE 2C is identical to the circuits of FIGURES 2A and 2B.

Figure 2E:
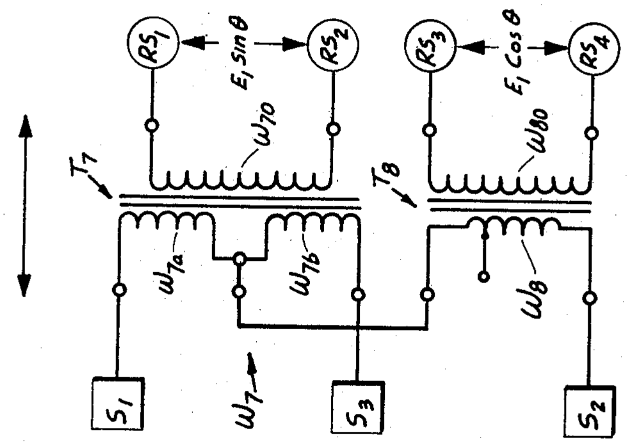
Figure 2D:
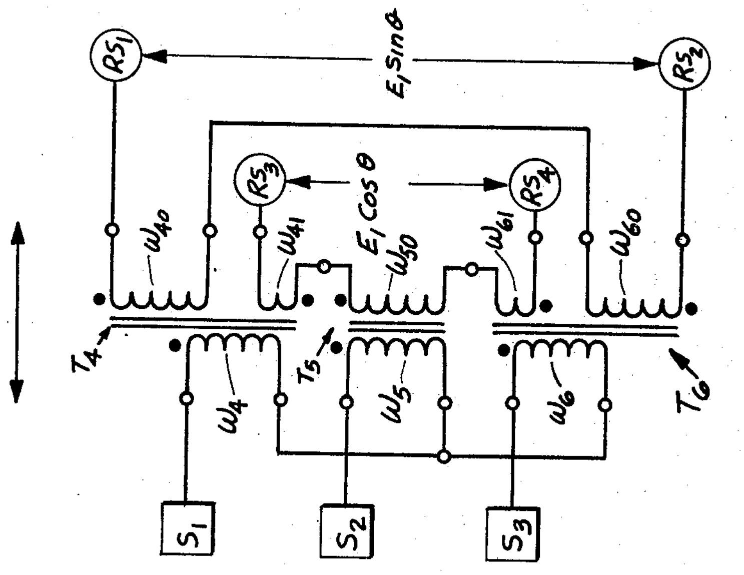

The converter of FIGURE 2D comprises three transformers $T_4$, $T_5$ and $T_6$ having Y connected synchro windings $W_4$, $W_5$ and $W_6$ respectively. These windings are connected to synchro terminals $S_1$, $S_2$ and $S_3$. The transformers $T_4$ and $T_6$ include resolver windings $W_{40}$, $W_{41}$ and $W_{60}$, $W_{61}$, respectively; transformer $T_5$ has a single resolver winding $W_{50}$.

Resolver windings $W_{40}$ and $W_{60}$ are connected in series-opposition to terminals $RS_1$ and $RS_2$ for providing the resolver sine function, $E_1 \sin \theta$. Windings $W_{41}$ and $W_{61}$ are connected in series-aiding and the combination is connected in series-opposition to $W_{50}$. This overall combination is connected to terminals $RS_3$ and $RS_4$ to yield $E_1 \cos \theta$. The ratios for synchro-to-resolver conversion are as follows:

$$W_4/W_{40}=K/(\sqrt{3/2})$$

$$W_4/W_{41}=K/(1/2)$$

$$W_5/W_{50}=K/1$$

$$W_6/W_{60}=K/(\sqrt{3/2})$$

$$W_6/W_{61}=K/(1/2)$$

An analysis of the arrangement of FIGURE 2D shows that it provides balanced impedance conditions with respect to the synchro terminals. The Y connection yieds relatively high input impedance and transformers $T_4$ and $T_6$, being identical, are especially adapted to provide the isolation function. Since each of these transformers includes two resolver windings, a choice of transfer ratios is available.

The converter of FIGURE 2E comprises a pair of transformers $T_7$ and $T_8$ having windings interconnected in a manner which resembles the so-called "Scott" connection which is utilized for converting a time phase system of one number to a time phase system of a different number of phases. The synchro side of $T_7$ comprises a winding $W_7$ which is tapped to provide sections $W_{7a}$ and $W_{7b}$. Transformer $T_8$ is provided with a single synchro winding $W_8$ which is connected at one end to synchro terminal $S_2$ and at its other end to the junction of $W_{7a}$ and $W_{7b}$. The outside terminals of $W_7$ are connected to synchro terminals $S_1$ and $S_3$ so that the synchro side is Y connected.

The transformers include respective resolver windings $W_{70}$ and $W_{80}$. Winding $W_{70}$ of $T_7$ is connected to resolver terminals $RS_1$ and $RS_2$ for supplying the voltage $E_1 \sin \theta$. $W_{80}$ provides $E_1 \cos \theta$ at terminals $RS_3$ and $RS_4$.

Suitable turns ratios for synchro-to-resolver conversion are as follows:

$$W_{7a}/W_{70}=K/1$$

$$W_{7b}/W_{70}=K/1$$

$$W_8/W_{80}=K/(\sqrt{3/3})$$

Balanced impedance and isolation functions are attainable in the arrangement of FIGURE 2E by proper choice of the value of K and by providing an accessible tap on $W_8$ so that $T_8$ and one primary-secondary transformer combination of $T_7$ (e.g., $W_{7a}$, $W_{70}$) are equal.

It may be seen from the foregoing that by virtue of the independent adjustability of the individual transformers, the converters may provide either balanced input or output impedances as required by their application in bridges and simulators.

In addition to the foregoing converters, the so-called "Woodbridge" type connection utilized in time domain polyphase converters may be employed for the mechanical phase conversion herein described. Additional circuits are also shown in connection with specific bridge and simulator arrangements hereinafter described.

BRIDGES AND BRIDGE-CONVERTER SYSTEMS

Resolver bridges are adapted to compute the angle $\theta$ from inputs $e_1$, $e_2$ of the form:

$$e_1=R \sin \theta \qquad (B_1)$$

$$e_2=R \cos \theta \qquad (B_2)$$

In the general case R is also unknown and includes the vector amplitude $E_1$ and appropriate scaling and dimension coefficients. Both relationships ($B_1$) and ($B_2$) are therefore required in order to derive $\theta$.

In a known prior art divider technique the ratio $e_1/e_2$ is measured with a linear decade inductive divider, say of five or six decades, whereby the divider reading representing tangent $\theta$ or cotangent $\theta$ is derived. This is accomplished by applying one of the voltages, e.g., $e_1$, across the entire divider; a null device has one terminal connected to $e_2$ and the other terminal connected to the movable contact of the divider. When the movable contact is adjusted through a range of trial ratios, to obtain a null, the divider is set at the ratio $e_1/e_2$ which represents tan $\theta$.

Of course, interchange of $e_1$ and $e_2$ will be necessary when the ratio $e_1/e_2$ is outside the range of the divider. Polarities must also be controlled.

Obtaining tangent $\theta$ is only a part of the described solution. The ratio, e.g., 0.57735 must be translated into the actual angle, e.g., 30° by consulting a table of tangent or cotangent functions. This mental or manual step places a serious limitation on the described technique since it rules out practice use in automatic processing systems and further, because it creates the hazard of error and runs counter to the art's preference for self-sufficient instruments. While there are known mechanical and electrical techniques for the machine conversion of tangent $\theta$ to $\theta$ so that the divider setting can be so converted, these are either too complex or are not sufficiently accurate.

In addition to the foregoing, the described arrangement suffers from the disadvantage that the sine and cosine source for $e_1$ and $e_2$ are, in general, not symmetrically loaded by the measuring divider.

An alternate approach in the tangent measurement technique is to employ a trigonometric divider rather than a linear divider. In a sense, this is equivalent to converting tangent $\theta$ to $\theta$ within the divider, rather than by mechanisms between the divider arm and the output indicator.

Thus, if a single divider winding is tapped at 44 points, spaced or otherwise weighted as a function of tangent rather than linearly, to yield the ratios: tan 1°, tan 2°, tan 3° . . . tan 45°, then the divider setting at null can be directly calibrated as the angle. For angles greater than the practical range, say 46°, appropriate switching is necessary whereby the cotangent function would be employed.

Assuming that the required resolution, e.g., to say six places ($10^{-6}$) can be secured at each tap, as by a trimming arrangement, so that a sufficiently accurate ratio representing each 1° point were obtained, there is still the limitation not found in the use of linear decades, viz., that the angular resolution is limited by interpolation problems. Typical requirements call for angular resolution to one thousandth of a degree. Without interpolation, i.e., with a single divider, 45,000 taps would be required in implementing the above approach; this is not, in general, a feasible solution.

Although interpolation between taps, e.g., by cascading further dividers in the manner of cascaded decade dividers, suggests itself as a means of increasing angle resolution, the relation of $\theta$ to tan $\theta$ in the 1° [or any other] increments is not linear. Hence the use of linear interpolation introduces an error which manifests itself in a difference between input $\theta$ and indicated output angle $\alpha$ notwithstanding a null condition is obtained. Compensation while possible is complicated in that over each interpolation interval a different interpolation error correction is required; the linear interpolation arrangement is thus also burdened with significant disadvantages. In addition, the asymmetrical loading problem also remains.

An alternate technique employs the relationship $\alpha=\theta$ when:

$$R_1 \cos \theta \sin \alpha=R_1 \sin \theta \cos \alpha \qquad (B_3)$$

Figure 3A:
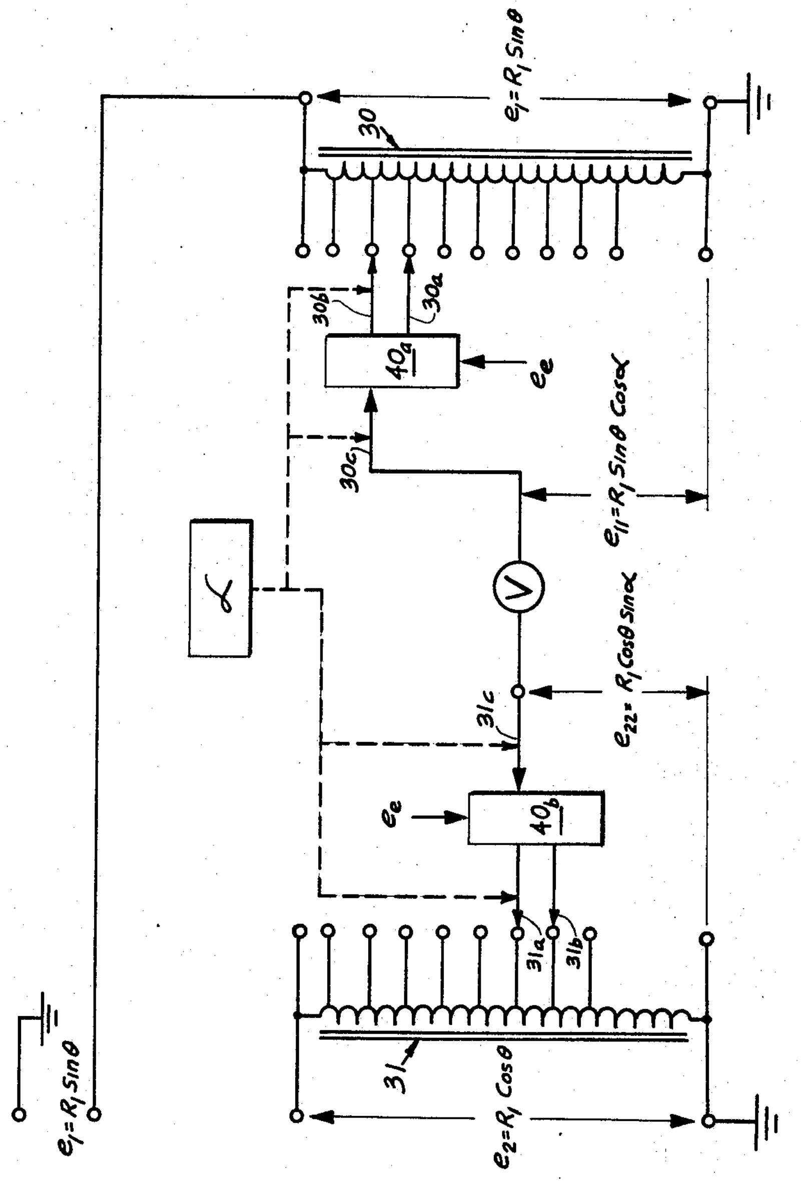
FIGURES 3A and 3B are schematic diagrams illustrating resolver bridge arrangements.

Referring to FIGURE 3A, a first computing divider 30 is shown energized by voltage $e_1=R_1 \sin \theta$ and a second computing divider 31 by $e_2=R_1 \cos \beta$, with the dividers having a common connection illustratively connected to ground. The dividers include respective interpolators 40*a*, 40*b*.

The movable contacts of dividers 30, 31 and their interpolators are jointly adjusted to set in trial angle $\alpha$; brushes 30*a*, 30*b*, 30*c* of divider 30, 40*a* select a ratio representing cosine $\alpha$ while 31*a*, 31*b*, 31*c*, of divider 31, 40*b* are positioned to select sine $\alpha$. The angle $\alpha$ is the angle read out of the bridge as equal to $\theta$ when proper conditions [e.g., a null] are achieved.

Since divider 30 is energized by $R_1 \sin \theta$ and the brushes 30*a*–30*c* thereof are set at cosine $\alpha$, then the voltage $e_{11}$ between 30$c$ and ground is equal to $R_1 \sin \theta \cos \alpha$ [provided there is no significant loading].

Similarly, the voltage $e_{22}$ at brush 31$c$ is $R_1 \cos \theta \sin \alpha$. These voltages are applied to a meter V. If $\alpha$ is varied by adjusting the divider brushes until $e_{11}$ equals $e_{22}$, e.g., when these voltages yield a null on meter V, then $\alpha=\theta$ and the setting of the divider brushes represents $\theta$. Hence, and assuming infinite resolution and no errors, $\theta$ has been computed.

It may be noted that the fixed taps of dividers 30 and 31 are trigonometrically distributed or have outputs modified to yield trigonometric functions. The dividers are preferably of identical static construction. Their brushes, however, are located and driven in complementary relationship whereby one represents the sine and the other the cosine function. It may also be noted that the sources $e_1$ and $e_2$ are symmetrically loaded at the null condition. However, two dividers are required in contrast with the single divider used in the tangent technique.

In actual practice dividers 30 and 31 have limited resolution. Additional interpolation for usable resolution is therefore required. In the arrangement shown in FIGURE 3A the two brushes 31$a$ and 31$b$ selected the values sine $\alpha_1$ and sine $\alpha_2$, bounding the increment containing the particular value of $\theta$ while interpolation between these values is provided by the interpolating circuit 40$b$. Similarly, interpolator 40$a$, connected to brushes 30$a$ and 30$b$ of divider 30, interpolates between $\cos \alpha_1$ and $\cos \alpha_2$. As noted hereinbefore, the linear interpolation generates an error in $\alpha$, i.e., in the computed value of $\theta$, provided dividers 40$a$ and 40$b$ are linear rather than trigonometric.

It may be here noted, that the interpolation problem manifests itself in the case of values of $\theta$ which are not equal to the angles represented by the taps on dividers 30 and 31; this follows because the error occurs when it is required to interpolate between taps. As angle $\theta$ departs from correspondence with the particular tap value, the error varies. This error may be defined in a number of ways. Since in usage of a practical bridge, the error represents the difference between the actual value of the input angle $\theta$ and the output or read-out angle $\alpha$ when the bridge is nulled, definition of the error based on this condition is generally referred to herein.

An analysis of the errors generated in the course of interpolation in the circuit of FIGURE 3A indicates that an error function prevails which may be compensated at discrete interpolation points to significantly improve system accuracy. This compensation is schematically indicated in FIGURE 3A by the introduction of appropriate ratio compensation, as signified by $e_e$ at appropriate points of dividers 40$a$ and 40$b$. Specific means for accomplishing this are illustrated more fully hereinafter.

In contrast with the foregoing interpolation technique, the basic sine-cosine approach of FIGURE 3A may be combined with a ratiometric technique as described below (rather than a linear interpolation with or without compensation) to yield the desired accuracy with a concomitant relative reduction in complexity.

Figure 3B:
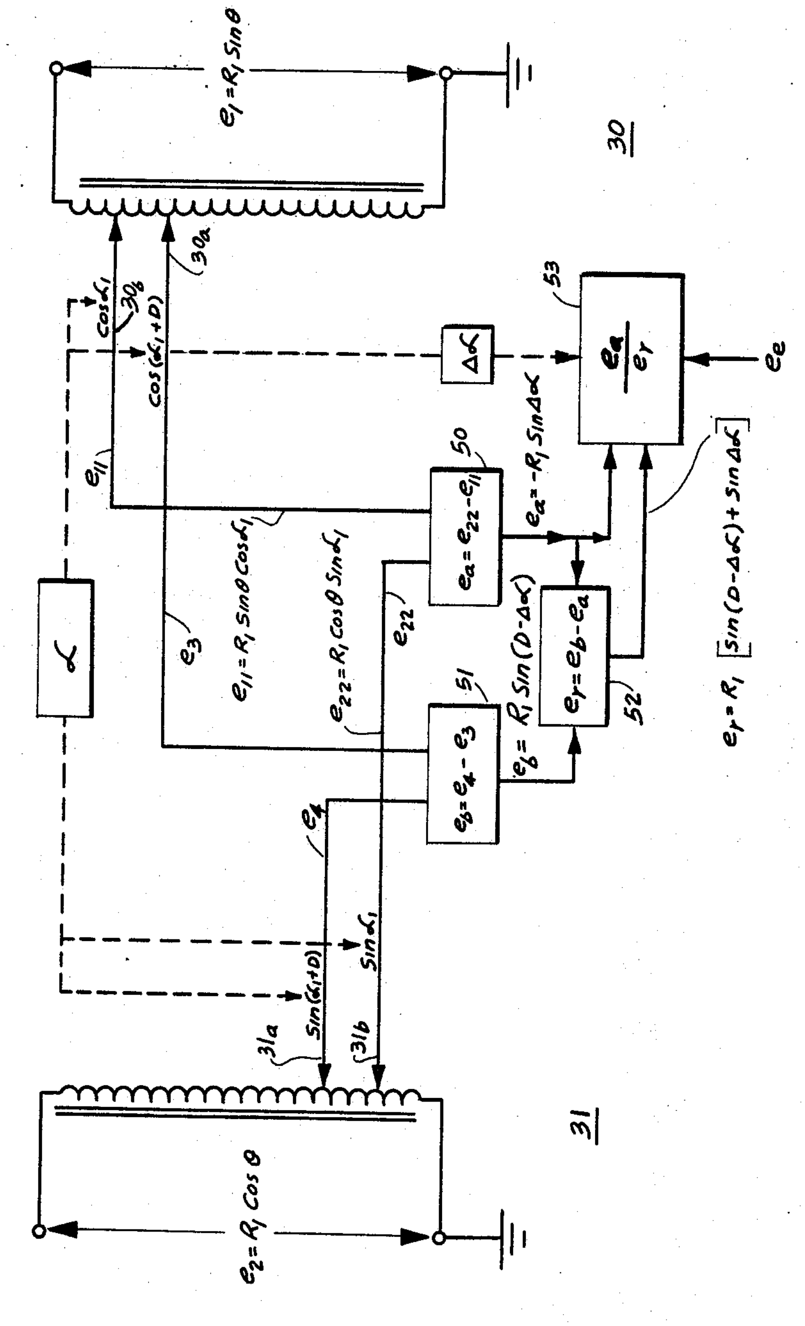

In FIGURE 3B, the voltage $e_{22}$ representing $R_1 \cos \theta \sin \alpha_1$, is combined with the voltage $e_{11}$ representing $R_1 \sin \theta \cos \alpha_1$, in a differencing type algebraic summing circuit 50 which yields a voltage $e_a$. When $\theta$ equals $\alpha_1$, the voltage $e_a$ is zero in analogy to the null voltage applied to meter V in FIGURE 3A. As $\theta$ departs from $\alpha_1$, i.e., where $\theta=\alpha_1+\Delta\alpha$, then it can be shown that $e_a$ varies according to the relationship:

$$e_a=-R_1 \sin \Delta\alpha \qquad (B_4)$$

It may be noted that $e_a$ has the potentiality of indicating the value of $\Delta\alpha$ and thus indicating $\theta$. However $R_1$ is also an unknown. Hence without more data, $\Delta\alpha$ can not be determined from $e_a$. If a voltage $e_r'$ equal or proportional to $R_1$ can be obtained, then from ($B_4$) above, $e_a/e_r' \alpha \sin \Delta\alpha$. A single divider can be employed to calculate the value $e_a/e_r$ whence $\sin \Delta\alpha$ is obtainable without the need for multiple interpolating arrangements such as hereinbefore described. As will be shown below, a simple technique yields a voltage approximately proportional to $R_1$. Moreover, the error resulting from lack of complete proportionality, when combined with the error associated with the further approximation that $\Delta\alpha \approx \sin \Delta\alpha$, yields a net error which is less than either of its components and which is, moreover, readily compensated. It is to be understood however, that apart from its amenability to simple compensation, the generation of the voltage, $e_r$, as shown below, which is independent of tap position, permits a ratiometric technique as a method of interpolation whereby significant advantages accrue.

As seen in FIGURE 3B, voltages $e_3$ and $e_4$ appear at brushes 30$a$ and 31$a$ respectively, of the dividers 30, 31 and these brushes are each displaced a distance corresponding to a given increment D from the associated brushes 30$a$ and 31$a$. Hence, the position of brush 30$a$ represents $\cos (\alpha_2+D)$ while 31$a$ represents $\sin (\alpha_1+D)$. Relative to ground, the voltages $e_3$ and $e_4$ on brushes 30$a$, 31$a$ are:

$$e_3=R_1 \sin \theta \cos (\alpha_1+D) \qquad (B_5)$$

$$e_4=R_1 \cos \theta \sin (\alpha_1+D) \qquad (B_6)$$

If these two voltages are subtracted in a differencing type algebraic summing circuit such as 51, a voltage, $e_b=e_4-e_3$, is obtained which voltage is (where $\theta=\alpha_1+\Delta\alpha$ as before):

$$e_b=R_1 \sin (D-\Delta\alpha) \qquad (B_7)$$

If now $e_b$ and $e_a$ are subtracted, as in another differencing circuit 52, a voltage $(e_b-e_a)=e_r$ is obtained, and from ($B_4$) and ($B_7$), $$e_r=R_1 [\sin (D-\Delta\alpha)+ \sin (\Delta\alpha)] \qquad (B_8)$$

Analysis will show that $e_r$ is approximately equal to $R_1 \cdot D_1$, where $D_1$ is D modified by a constant to account for the dimensional difference between sine and the angle. Since $D_1$ is a constant, then $e_r$ is approximately proportional to $R_1$ and substantially independent of $\alpha_1$. Hence $$e_a/e_r \cong \sin \Delta\alpha/D_1 \qquad (B_9)$$

It can be seen that in this approach $\sin \Delta\alpha$ may be derived by a ratiometric technique which is used for computing $e_a/e_r$; the interpolation described in connection with FIGURE 3A is thereby avoided. Moerover, it is found that when the further approximation is made that:

$$e_a/e_r \cong \Delta\alpha/D=q_1 \qquad (B_{10})$$

then the error resulting from the combined approximations is less than either component error and takes on a character which is readily compensated to yield an ultimate computation of high accuracy. This result can be seen by an analysis of the error resulting when the ratio $e_a/e_r$ is rigorously computed as by divider 53. Thus, $$e_a/e_r=q=1\left[\frac{\sin (D-\Delta\alpha)}{\sin \Delta\alpha}+1\right] \qquad (B_{11})$$

The factor $q$ represents the computed or measured value of the ratio. If $q_1$ is defined as the ratio $\Delta\alpha/D$, see ($B_{10}$) above, and if values of $\Delta\alpha$ are assigned to ($B_{11}$) above, it will be found that $q$ is different from $q_1$ by the functions such as $f_1$, $f_2$ plotted in FIGURE 3C.

The function $f_1$ is for $D=10°$, while $f_2$ represents the increment $D=5°$. It can be shown that peak values of $f_1$ and $f_2$ are each about ¼ the peak amplitude of the corresponding functions associated with the straightforward interpolation.

The error functions $f_1$, $f_2$ are independent of tap setting $\alpha_1$ and thus admit of a particularly simple compensation technique as will be described below. Hence the required net system accuracy is readily achieved. It should of course be borne in mind that the ratio $e_a/e_r$ is actually computed rigorously whereby the above described error is generated. The error for discrete values of $\theta$ within the range D, may be compensated by ratio compensation effected, for example, by injecting into the system, e.g., at divider 53, a voltage $e_e$ for each of the selected values of $\theta$ within the interpolated increment. For example and with reference to FIGURE 3*C*, a set of voltages corresponding to the amplitudes of $f_1$ or $f_2$ at the values of $\theta$ equal to .1D, .2D, .3D . . . D, can be supplied such that the error is reduced to near zero (e.g., two seconds or less) for these values of $\theta$. Circuit arrangements providing this are described hereinafter. These arrangements are characterized by significant simplicity. For example, they eliminate the need for a divider or alternatively permit a 50% reduction in the number of taps required. Typical savings in costs of 20% or 30% may thereby be realized.

Figure 3C:
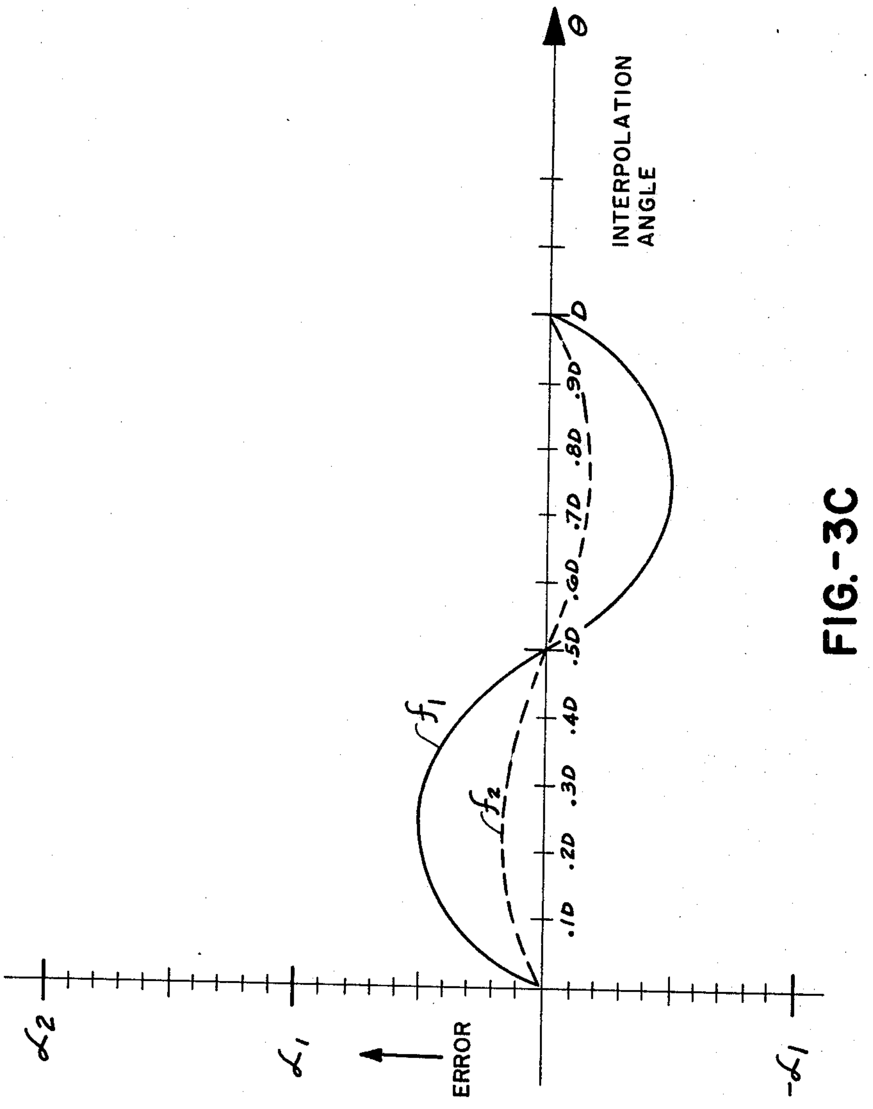
FIGURE 3C is a plot of certain error functions related to bridge and simulator data processing.
Figure 3D:
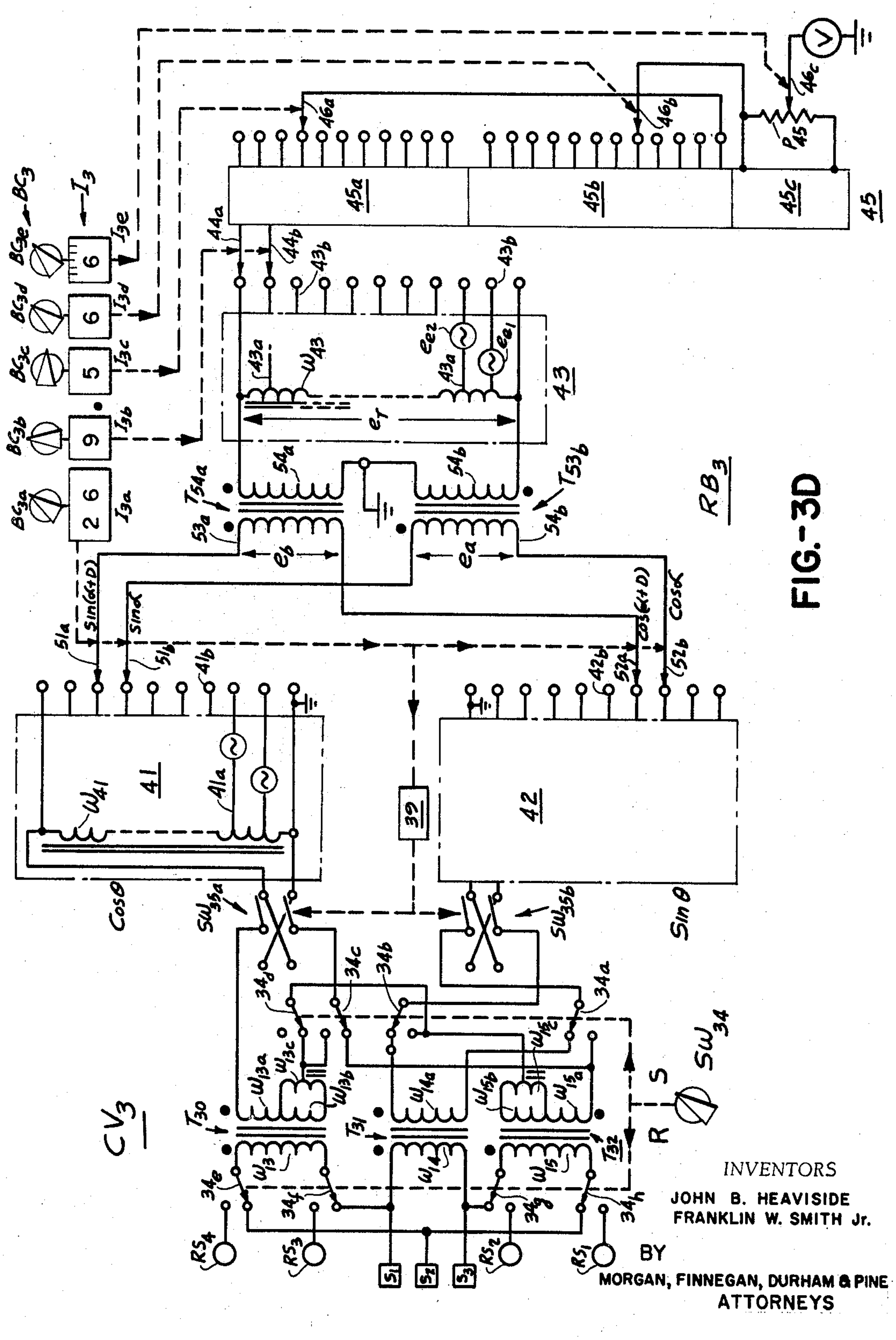
FIGURE 3D is a schematic diagram of a resolver type bridge energized via a form converter and isolator.

A detailed embodiment of the circuit of FIGURE 3B is illustrated in FIGURE 3D. The bridge system shown therein includes synchro-resolver converter and isolator $CV_3$ and a resolver type bridge $RB_3$ energized from the converter. With synchro data supplied at input terminals $S_1$, $S_2$ and $S_3$, and with mode selector $SW_{34}$ in the synchro position, then the input synchro data is converted to resolver form and coupled to the bridge $RB_3$. Adjustment of the bridge via bridge controls $BC_3$ to achieve a null on meter V, results in the computation of input angle $\theta$ which is illustrated on read-out indicator $I_3$.

With resolver data applied at input terminals $RS_1$–$RS_4$ inclusive and with the mode selector $SW_{34}$ in the resolver mode, converter $CV_3$ supplies coupling with isolation, of the resolver data to the bridge. The bridge is adjusted as previously described whereby the resolver angle $\theta$ is computed.

The converter $CV_3$ comprises transformers $T_{30}$, $T_{31}$ and $T_{32}$ having input windings $W_{13}$, $W_{14}$ and $W_{15}$, respectively. These windings are adapted for connection to the synchro and resolver terminals via switch sections 34*e*, 34*f*, 34*g* and 34*h* operated by the mode selector $SW_{34}$. The switches are shown in the synchro position whereby the input windings are series-connected in delta configuration to the synchro terminals $S_1$, $S_2$ and $S_3$.

The transformers $T_{30}$ and $T_{32}$ each include secondary windings tapped to form two sections $W_{13a}$, $W_{13b}$ in the case of $T_{30}$ and $W_{15a}$ and $W_{15b}$ in the case of $T_{32}$. Windings $W_{13b}$ and $W_{15b}$ are each shunted by a respective tapped winding $W_{13c}$, and $W_{15c}$, which in effect constitute dividers across a part of the secondary for providing the requisite resolution (on separate cores). The tap on $W_{13c}$ is connected to fixed contacts of switch sections 34*c* and 34*d* while the tap on $W_{15c}$ is connected to switch 34*d* and additional switch section 34*b*. These sections along with an additional section 34*a* are also operated by the mode selector $SW_{34}$.

Transformer $T_{31}$ is provided with a single secondary $W_{14a}$ which has one end connected to a fixed tap of 34*b* and the other end to 34*a*. By tracing the circuit wtih the switches in the synchro mode as shown, it may be noted that the secondary windings of $T_{30}$ and $T_{32}$ are connected in series-opposition and applied to a divider 41 via reversing switch $SW_{35a}$. This circuit converts the synchro data to the cosine resolver voltage.

The sine function voltage is developed across winding $W_{14a}$ of transformer $T_{31}$ and in the switch position shown, this voltage is applied to a divider 42 via reversing switch $SW_{35b}$. The latter and reversing switch $SW_{35a}$ are switched as required via an actuator 39 which is driven from the bridge control $BC_{3a}$. The latter is adjusted in accordance with the 10° increments of bridge angle.

In summary, the above described circuit, when in the illustrated condition, converts the synchro voltages at $S_1$, $S_2$ and $S_3$, to equivalent resolver voltage with the cosine component being applied to divider 41 and the sine component applied to similar divider 42.

With the mode selector switch in the resolver mode it will be noted that the following circuit conditions obtain. Winding $W_{13}$ is connected to resolver terminals $RS_3$ and $RS_4$. Winding $W_{15}$ is connected to resolver terminals $RS_1$ and $RS_2$. Secondary winding $W_{14a}$ is disconnected. The secondary of $T_{30}$ which carries the cosine voltage is connected via the reversing switch $SW_{35a}$ to divider 41. The sine voltage appearing across the secondary of $T_{32}$ is applied to divider 42 via $SW_{35b}$. Hence in the resolver mode the converter is connected to provide coupling with isolation; the switching together with transformers $T_{30}$ and $T_{32}$ provide these functions.

Dividers 41 and 42 are preferably of identical construction. Each illustratively comprises an auto transformer divider $W_{41}$ having 10° taps 41*a* which are connected to corresponding output taps 41*b*. The latter are adapted to be selectively contacted by brushes 51*a* and 51*b* which are spaced to contact adjacent fixed taps. The brushes 51*a* and 51*b* are driven in complementary fashion with respect to corresponding brushes 52*a* and 52*b* of divider 42. Thus, the sine and cosine of the selected angle $\alpha$ are simultaneously derived with identical dividers. The 0 ratio tap of each divider is connected to the reference potential point which is illustratively ground.

Selected taps of each divider 41, 42 have their ratios modified for attaining the requisite resolution. This trimming may be accomplished in any of a variety of ways including the trimming arrangement used in transformers $T_{30}$, $T_{31}$. By the appropriate arrangement the required resolution in the trigonometric ratio at each tap is achieved. For example, the voltage added by way of winding 41*e* can add three additional significant figures to the three-digit ratio attained by the tapped position to yield six-digit resolution at each 10° tap. Generally, no resolution increase or trimming will be required for the sine 0°, sine 30°, and sine 90° taps. The coarse value of the trigonomometric function at each 10° tap is illustratively attained by varying the number of turns of winding 41 between tap points.

In analogy to the general arrangement illustrated in FIGURE 3B, it may be seen that the voltage at brush 51*b* is a function of $\cos\theta \sin\alpha_1$ while the voltage at 52*b* varies in accordance with $\sin\theta \cos\alpha_1$. The difference between these two voltages is obtained in the illustrated embodiment by connecting the brushes to a winding 53*b* of a transformer $T_{54b}$. Hence the voltage across this winding constitutes voltage $e_a$ of FIGURE 3B.

In like manner, the voltages representing $\cos\theta \sin(\alpha_1+D)$ and $\sin\theta \cos(\alpha_1+D)$ are supplied from brushes 51*a* and 52*a* respectively to a winding 53*a* of a transformer $T_{54a}$ such that the difference voltage $e_b$ appears across this winding.

The voltages $e_a$ and $e_b$ after suitable transformation provided by the associated transformer are combined in accordance with their difference to obtain voltage $e_r$. Accordingly, secondary winding 54*a* of $T_{54a}$ is connected in series-opposition with winding 54*b* of $T_{54b}$. The resultant net voltage $e_r$ is combined with the transformed voltage $e_a$ to form the ratio $e_a/e_r$.

In the illustrated embodiment this is accomplished by connecting the windings 54*a* and 54*b* across the divider 43, the junction of the two windings being grounded. Divider 43 is preferably an auto transformer divider which is linearly tapped at 1° intervals, as at 43*a*. The voltages appearing at the taps are modified however, by the injection of respective special compensating voltages $e_{e1}$, $e_{e2}$, etc. For the S-type error function illustrated in FIGURE 3C, these voltages are relatively proportioned in accordance with that function and hence no corrective voltage is required at the .5D and end taps. This proportioning of the injected compensating voltages has the effect of correcting ratios thereby reducing the error at the points .1D, .2D, 3D . . . .9D to a very low value and permitting further linear interpolation without introduction of errors of consequence.

The compensated voltages are applied to output taps 43*b* of the divider 43. Selectively connected to these taps is an interpolating divider comprising three cascaded sections 45*a*, 45*b* and 45*c*. Illustratively, the cascaded sections are connected in series type relationship. Section 45*a* includes a pair of brushes, 44*a*, 44*b* driven by the "units" control $BC_{3b}$ and adapted to select adjacent taps of the divider 43. The output taps 45*a* are in turn selectively contacted by brush 46*a* as a function of the "tenths" control $BC_{3c}$.

In analogous fashion brush 46*b* of divider 45*b* is operated by the "hundredths" control $BC_{3d}$ while the output divider, comprising a potentiometer $P_{45}$, has its arm 46*c* positioned by the "thousandths" control $BC_{3e}$. Operation of the controls $BC_3$ to attain a null condition on meter V results in the computation of the angle $\theta$ which is illustratively displayed on the indicator $I_3$.

It should be noted that the compensating voltages $e_{e1}$, $e_{e2}$ [corresponding to the voltages $e_e$ in FIGURES 3A and 3B] may be derived by the trimming techniques illustrated in connection with converter $CV_3$ or by other arrangements such as selective loading. These techniques or tap distribution alone, may be employed to develop the compensating voltage corresponding to the error function illustrated in FIGURE 3C.

Figure 3E:
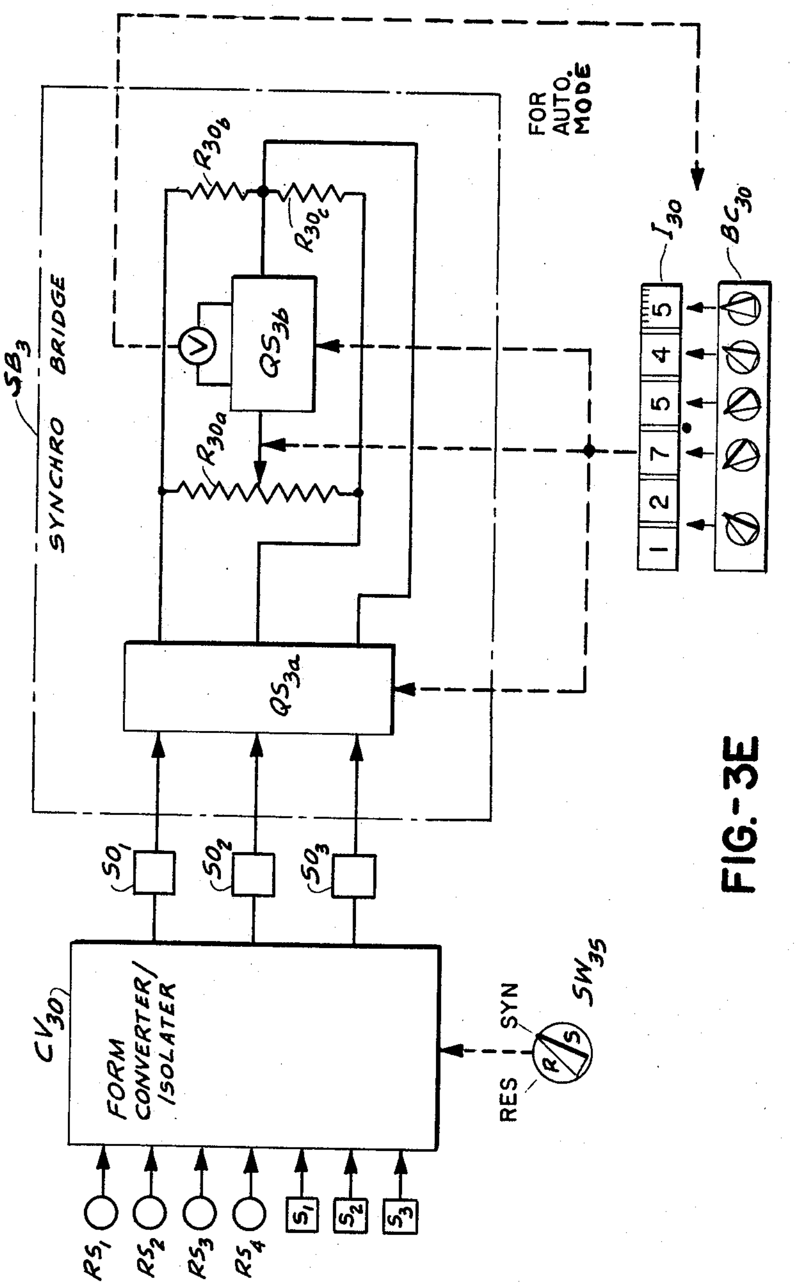
FIGURE 3E is a schematic diagram of a synchro type bridge energized via a form converter and isolator.

In contrast with the resolver bridge of FIGURES 3A, 3B, 3D, the arrangement of FIGURE 3E employs a synchro bridge $SB_3$. This bridge is energized from a form converter/isolator $CV_{30}$ which may be selected from the form converters described hereinbefore. The converter includes switching means under the control of mode selector $SW_{35}$ which functions in the resolver mode to convert the resolver data to synchro form and in the synchro mode to couple the input synchro data to the bridge with isolation being provided. The output voltages of the converter, appearing at terminals $SO_1$, $SO_2$ and $SO_3$ are applied to a known synchro bridge circuit which includes three resistive or inductive elements $R_{30a}$, $R_{30b}$ and $R_{30c}$ in delta configuration. The junctions of these elements are connected to the input terminals via appropriate switching circuits $QS_{3a}$ which are operative at 60° intervals to interchange the relative connections of the bridge and input terminals.

The bridge also includes a null indicator V which is connected to the junction of $R_{30b}$–$R_{30c}$ and to the brush of $R_{30a}$ via another quadrant switching arrangement $QS_{3b}$ and additional interpolators where required.

The bridge is adjusted from control means $BS_{30}$ until a null is observed on meter V. The angle represented by the input resolver or synchro data is then indicated by read-out device $I_{30}$.

Figure 3F:
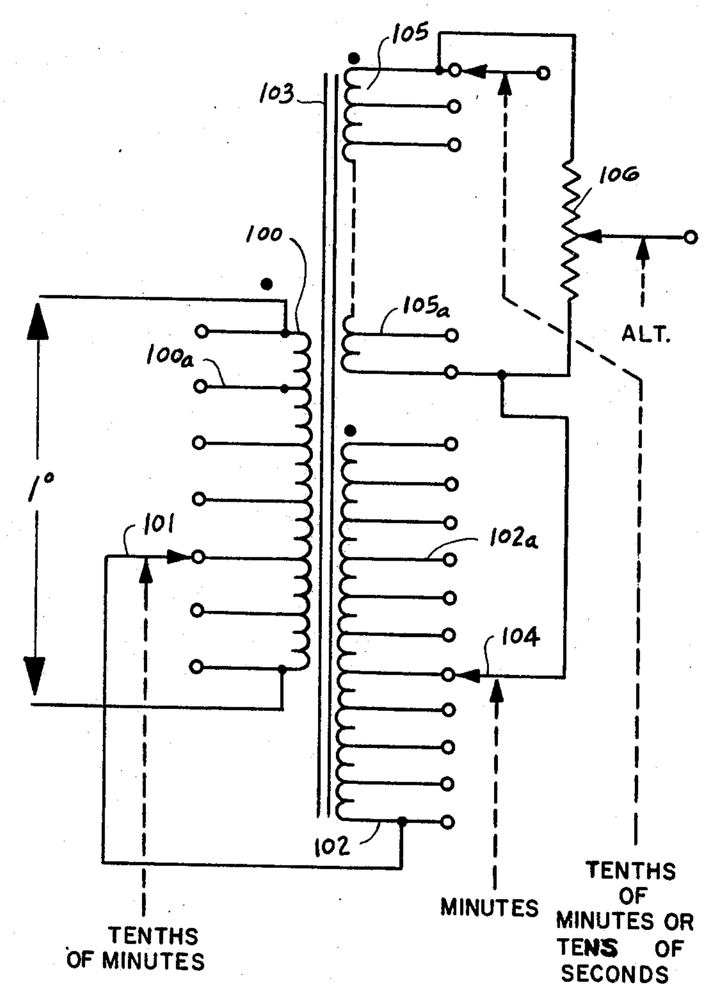
FIGURE 3F is a schematic diagram of a divider arrangement for yielding data in the dimensions of minutes and seconds, or minutes and fractions of minutes.

In the embodiments hereinbefore illustrated the various dividers and interpolators have been instrumented to yield the angular data in terms of angles and fractions thereof. It is desirable in some applications however, to indicate the computed or simulated angle in terms of degrees, minutes and seconds or degrees, minutes and fractions of seconds. To this end the arrangement illustrated in FIGURE 3F may be employed for division or interpolation in connection with both bridge measurements and simulation or function generation.

The arrangement includes a winding 100 which is adapted to be energized by signals representing 1° increments. Winding 100 is tapped to provide six increments, each representing a 10-minute interval. A brush 101 selects the desired interval and this brush is connected to a winding 102 on common core 103. Winding 102 is provided with taps 102*a* spaced equally to yield 10 increments each representing an interval of a minute. A brush 104 selects the appropriate tap and is connected to a third winding 105 also on core 103. Winding 105 is provided with taps 105*a* which divide the winding linearly into ten or six increments according to whether fractions of minutes or ten second intervals are desired. Alternatively, winding 105 may be used to energize a potentiometer 106, the arm of which yields a signal providing increments of seconds or fractions of minutes or any desired subdivision of a minute.

The required ratio among the windings 105, 102 and 100 is 1:10:60. The selection of the required number of taps on 105*a* automatically determines the subdivision of the minutes as indicated above.

AUTOMATIC BRIDGE SYSTEMS

In certain applications the bridge system is preferably of the automatic or closed loop type. For example, as shown in FIGURE 1, the output of the error detector 4 may control the bridge adjustment system 3 which varies the bridge dividers to thereby automatically adjust the bridge to a condition of balance. The automatic balancing system may include a servo amplifier operated by the error detector and a servo motor for adjusting the bridge controls. Alternatively, and preferably the bridge dividers and interpolators may be operated according to a digital technique wherein the turns ratios are varied in accordance with a suitable coding arrangement, for example a binary coded system, with the aid of switching elements such as relays or solid state switches. Apart from use in the automatic bridge configuration, this form of control over the bridge is particularly suited for remote control or programming of the bridge circuit.

Figure 7:
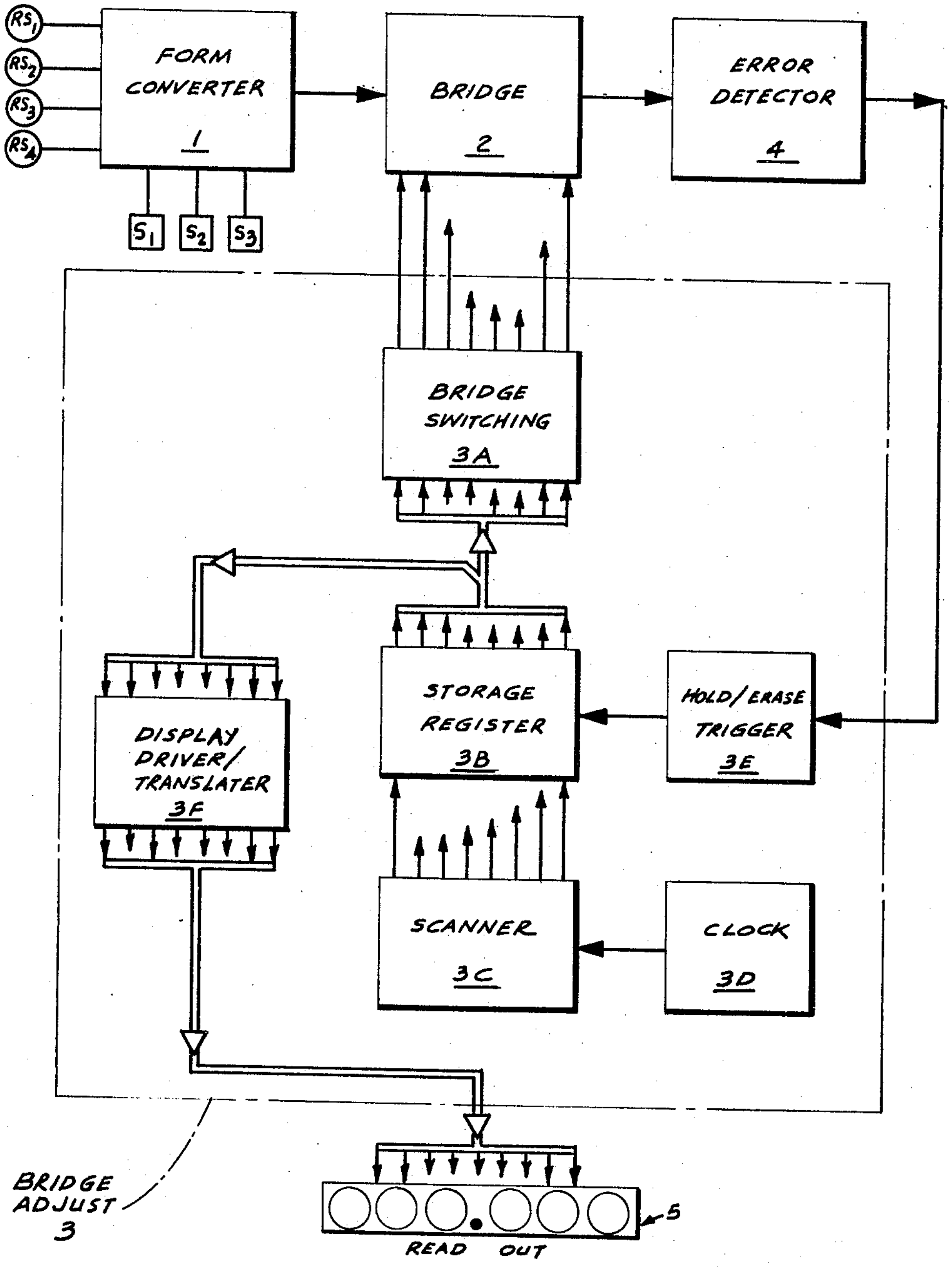
FIGURES 7 and 7A–7C are schematic diagrams of automatic bridge systems and components including digital switching arrangements therein.

An exemplary automatic bridge arrangement is illustrated in FIGURE 7 which may be seen to be a more detailed illustration of the system of FIGURE 1.

Referring to FIGURE 7, the form converter 1 is as hereinbefore described and couples the converter or translated signals to the bridge circuit 2. In the illustrated embodiment, the bridge is of the type shown in FIGURE 3D. An error detector 4 is responsive to the state of adjustment of bridge 2 and may include an error amplifier and phase sensitive detector. The output from the error detector will be an error signal having a polarity depending upon the direction of unbalance of the bridge, or, it will be in a null condition.

The output of the error detector is coupled to the bridge adjusting system 3 and specifically to a hold/erase trigger circuit 3E therein. The trigger circuit may comprise an appropriate binary arrangement such as a Schmitt trigger for developing a signal of two different states according to the output of the error detector. For example, when the trial angle $\alpha$ is greater than the input angle $\theta$, the trigger circuit develops an erase pulse; when $\alpha$ is equal to or less than $\theta$, the trigger circuit signals a hold condition.

The ouput of the trigger system is coupled to a storage register 3B which includes a plurality of storage channels each allocated to a particular trial angle.

In the illustrated embodiment there are 23 such channels corersponding to 23 trial angles $\alpha_1, \alpha_2, \alpha_3 \ldots \alpha_{23}$. These channels, which may each comprise a latching switch arrangement, are actuated in succession from 23 command lines successively pulsed by a scanner system 3C driven by a clock unit 3D. The latter may comprise an oscillator which feeds a train of pulses to the scanner. The scanner illustratively comprises a group of counters for energizing the storage register channels successively in the order of most significant trial angle, i.e., in the order $\alpha_1, \alpha_2 \ldots \alpha_{23}$.

In the illustrated embodiment the scanner comprises a flip-flop counter system for counting the clock pulses and generating a binary coded signal which identifies and causes the pulsing of the command line to be energized. The scanner illustratively includes a $23_{x7}$ matrix of diodes which translates the counter into actuation of the appropriate control line.

As each channel of the storage register is successively energized it causes related switching actions in the bridge switching system 3A. The latter includes a matrix of switching elements whereby the bridge ratios are varied to set into the bridge the appropriate trial angle $\alpha_1, \alpha_2 \ldots \alpha_{23}$.

The effect of the particular trial angle is to increase the net previously stored angle by the amount of the trial angle and the effect of the net angle is sensed by the error detector 4 which feeds a related signal to the hold/erase trigger 3E. As noted hereinbefore, when $\alpha$ is greater than $\theta$, the trigger circuit causes the particular command line responsible for this excessive angular increment to be erased. If, on the other hand, the particular net angle $\alpha_n$ is equal to or less than $\theta$, then the trigger circuit signals the storage register to hold or retain the last trial angle increment. In terms of circuit operation, the last energized channel in the storage register is maintained in the stored condition.

As a simple example, assume that $\theta$ equals 50°. Initial trial angles of $\alpha$ greater than this value are erased due to the above described action. With a trial angle of 40° set into the bridge, the error detector and trigger circuits command the storage register to retain the 40° angle. The next input angle, which may be 10°, is added to the stored 40° angle to yield a net input angle of 50°. This equals the assumed value of $\theta$ and thus the new increment is retained. The next succeeding input however causes the net trial angle to exceed $\theta$ and is therefore erased. All additional inputs are similarly erased. This procedure of successive approximations is continued to the end of the scanned cycle when all 23 values of $\alpha$ have been tried. In the course of this cycle, balance will have been attained at some point and all additional inputs thereafter erased.

Those channels in the storage register which have been maintained in the stored condition comprise the coded address of that trial angle which equals $\theta$. This angle is read out of the storage register at the end of the scanning cycle and is displayed on read-out 5 via a display driver/translator 3F. The driver/translator illustratively comprises a digital translator for translating the binary coded address of the balance angle into the signals required by the read-out system. The indicator is conditioned or gated for display at the end of the scan cycle. After a display time, which may be adjustable, the over-all cycle is repeated. Hence changes in $\theta$ are regularly tracked, computed and read-out.

To summarize the structure and process respecting the system of FIGURE 7, an example is given in which the input angle $\theta$ equals 75.744°. The trial angles generated in the system in the order of their generation are as listed in Table I below. Each trial angle is added to all previously *retained* angles.

TABLE I

| | |
|---|---|
| $\alpha_1$=180 | $\alpha_{13}$=.2 |
| $\alpha_2$=90 | $\alpha_{14}$=.1 |
| $\alpha_3$=40 | $\alpha_{15}$=.08 |
| $\alpha_4$=20 | $\alpha_{16}$=.04 |
| $\alpha_5$=10 | $\alpha_{17}$=.02 |
| $\alpha_6$=10 | $\alpha_{18}$=.01 |
| $\alpha_7$=8 | $\alpha_{19}$=.008 |
| $\alpha_8$=4 | $\alpha_{20}$=.004 |
| $\alpha_9$=2 | $\alpha_{21}$=.002 |
| $\alpha_{10}$=1 | $\alpha_{22}$=.001 |
| $\alpha_{11}$=.8 | $\alpha_{23}$=Program function |
| $\alpha_{12}$=.4 | |

In the manner described hereinbefore, $\alpha_1$ and $\alpha_2$ would be erased. Angles $\alpha_3$, $\alpha_4$ and $\alpha_5$ would be stored. Angle $\alpha_6$ would be erased, $\alpha_7$ would be erased and $\alpha_8$ would be stored. Trial increment $\alpha_9$ would be erased and $\alpha_{10}$ would be stored. Extending this procedure, it will again be seen that $\alpha_{12}$, $\alpha_{13}$, $\alpha_{14}$, $\alpha_{16}$ and $\alpha_{20}$ would be stored and all other $\alpha$'s erased. Once $\alpha_{20}$ was set into the bridge, balance will have been obtained. However, the scanning continues through $a_{12}$, $\alpha_{22}$ and $\alpha_{23}$ to the end of the scanned cycles. It will be noted that the sum of the stored $\alpha$'s represents the balance angle and this angle is read out of the system for display and/or control purposes.

The foregoing system characteristics represent considerable simplification in system components. For example, the first two significant digits, when representing 10° increments from 0° to 350° would normally require at least 6 command lines in a conventional binary system. The control system in a straightforward approach, would involve over 200 control elements. Remembering that there are 4 functions involved, that a decimal display is frequently required although the conventional angular units are non-decimal, and that the angular functions have a periodicity which is non-decade, it can be seen that there is considerable potential complexity which has been avoided in the illustrated system.

The illustrated automatic bridge is preferably a digital electronic type which digitalizes a unit revolution into a half revolution $\alpha_1$ [or 180°, pi radians 3200 mils, etc.] and a ¼ revolution [90° $\pi/2$ radians, 1600 mils, etc.] to define a quadrant value $\alpha_2$. In addition to dividing the quadrant into a plurality of equal elements each representing a 10° angle, the quadrant is also divided into two main sub-divisions indicated by the trial angle $\alpha_3$ which illustratively represents an angle of 40°.

The foregoing approach results in considerable simplification in implementing the display or read-out, the switching and the control functions and this simplicity is preserved by the above-described procedure of successive approximations which start at the most significant digit and proceed in order to the least significant digit.

As is evident in Table I above, the binary code for representing the number of 10° increments within a particular quadrant is 40, 20, 10, 10 and hence the overall system employs a hybrid coding involving a binary coded non-decimal [or binary coded, angle oriented] system for trial angles in excess of 90° and a special binary coded decimal arrangement for trial angles between 90° and 10°.

In the implementation of this coding, switching for defining a particular *quadrant* is accomplished by causing the appropriate polarity reversals between the input data and the bridge dividers in the manner suggested, for example, by reverse switching $SW_{35a}$, $SW_{35b}$ in FIGURE 3D. [Additional means will be described hereinafter with respect to FIGURE 7A.]

An examination of the resultant functions indicates that the sine and cosine functions in the succeeding quadrants are the same as the cosine and sine functions, respectively, in the preceding quadrants. Hence the transformer used for sine $\alpha$ in the first quadrant may be used for cosine $\alpha$ functions in the second quadrant; the cosine $\alpha$ transformer in the first quadrant similarly becomes the sine $\alpha$ transformer in the second quadrant. The transformers may therefore be switched between the sine $\theta$ and cosine $\theta$ inputs in dependence upon the quadrant which is involved.

Analysis of function behavior within a quadrant indicates additional relationships which lead to further simplifications in the system. Considering the quadrants as divided into two main sub-divisions, e.g., octants $Q_a$ and $Q_b$, it may be noted that the numerical values of the sine function in the first octant, which values will be referred to as "low ratios" are numerically equal to the cosine values in the second octant, differing only in sequence. Similarly, the numerical values of a cosine in the first octant, referred to as "high ratios" numerically equal the values of the sine function in the second octant, with the difference again being in sequence only.

This relationship permits a reduction in the number of required taps or ratio forming elements. Thus, a set of "high ratio" taps or other ratio elements, will serve for the cosine function in the first sub-division and for the sine function in the second sub-division. The converse applies with respect to the "low ratio" elements.

Additional system simplification is based upon relationships which appear in Table II below. Values have been rounded off for illustration purposes.

TABLE II

| $F_1$ sin $\alpha$ | $F_2$ sin $[\alpha+10]$ | $F_3$ cos $[\alpha]$ | $F_4$ cos $[\alpha+10]$ | Angle $[\alpha]$ |
|---|---|---|---|---|
| .00 | .17 | 1.00 | .98 | 0 |
| .17 | .34 | .98 | .94 | 10 |
| .34 | .50 | .94 | .86 | 20 |
| .50 | .64 | .86 | .76 | 30 |
| .64 | .76 | .76 | .64 | 40 |
| .76 | .86 | .64 | .50 | 50 |
| .86 | .94 | .50 | .34 | 60 |
| .94 | .98 | .34 | .17 | 70 |
| .98 | 1.00 | .17 | .00 | 80 |

It may be seen by examination of this table that there is a complementary relationship between the values $F_1'$, $F_2'$, $F_3'$ and $F_4'$ of the listed functions $F_1$–$F_4$ for $\alpha=\alpha_1$ and the values $F_1''$, $F_2''$, $F_3''$ and $F_4''$ for $\alpha=80°\alpha_1$. Specifically:

$F_1'=F_4''$
$F_2'=F_3''$
$F_3'=F_2''$
$F_4'=F_1''$

Thus the taps or other points where ratios are provided can be further interchanged in going from one quadrant sub-division to the other. For example, a tap providing sine $\alpha$ in the first octant provides cosine $[\alpha+D]$ in the second octant.

Further simplifications result from the binary coding arrangement of 40, 20, 10, 10. The logic table representing that code, together with the bits assigned to the half revolution $[\alpha_1=180°]$ and quadrant $[\alpha_2=90°]$, are shown in Table III below:

TABLE III

| | 180° | 90° | 40° | 20° | 10° | 10'° |
|---|---|---|---|---|---|---|
| 00 | 0 | 0 | 0 | 0 | 0 | 0 |
| 10 | 0 | 0 | 0 | 0 | 1 | 0 |
| 20 | 0 | 0 | 0 | 1 | 0 | 0 |
| 30 | 0 | 0 | 0 | 1 | 1 | 0 |
| 40 | 0 | 0 | 1 | 0 | 0 | 0 |
| 50 | 0 | 0 | 1 | 0 | 0 | 1 |
| 60 | 0 | 0 | 1 | 0 | 1 | 1 |
| 70 | 0 | 0 | 1 | 1 | 0 | 1 |
| 80 | 0 | 0 | 1 | 1 | 1 | 1 |

The redundancy between the last two bits 10, 10', permits a flexibility in coding which leads to circuit simplification. In addition the 40 bit is particularly suitable for use as the indicator of the main sub-division within the quadrant. It may also be noted that the code itself is complementary as between any two angles which sum to 80°. For example, note that the 40, 20, 10, 10', code for 20°, is the complement of the code for 60°. This relationship permits a single switching assembly to indicate one angle in its energized state and another angle in its deenergized state.

As a result of the circuit simplifications resulting from the foregoing, the actual selection of ratios is accomplished with a three digit control system primarily involving the control channels allocated to the 20, 10 and 10', bits. These generate the basic switching data which is then used in both sub-divisions of each quadrant.

Figure 7A:
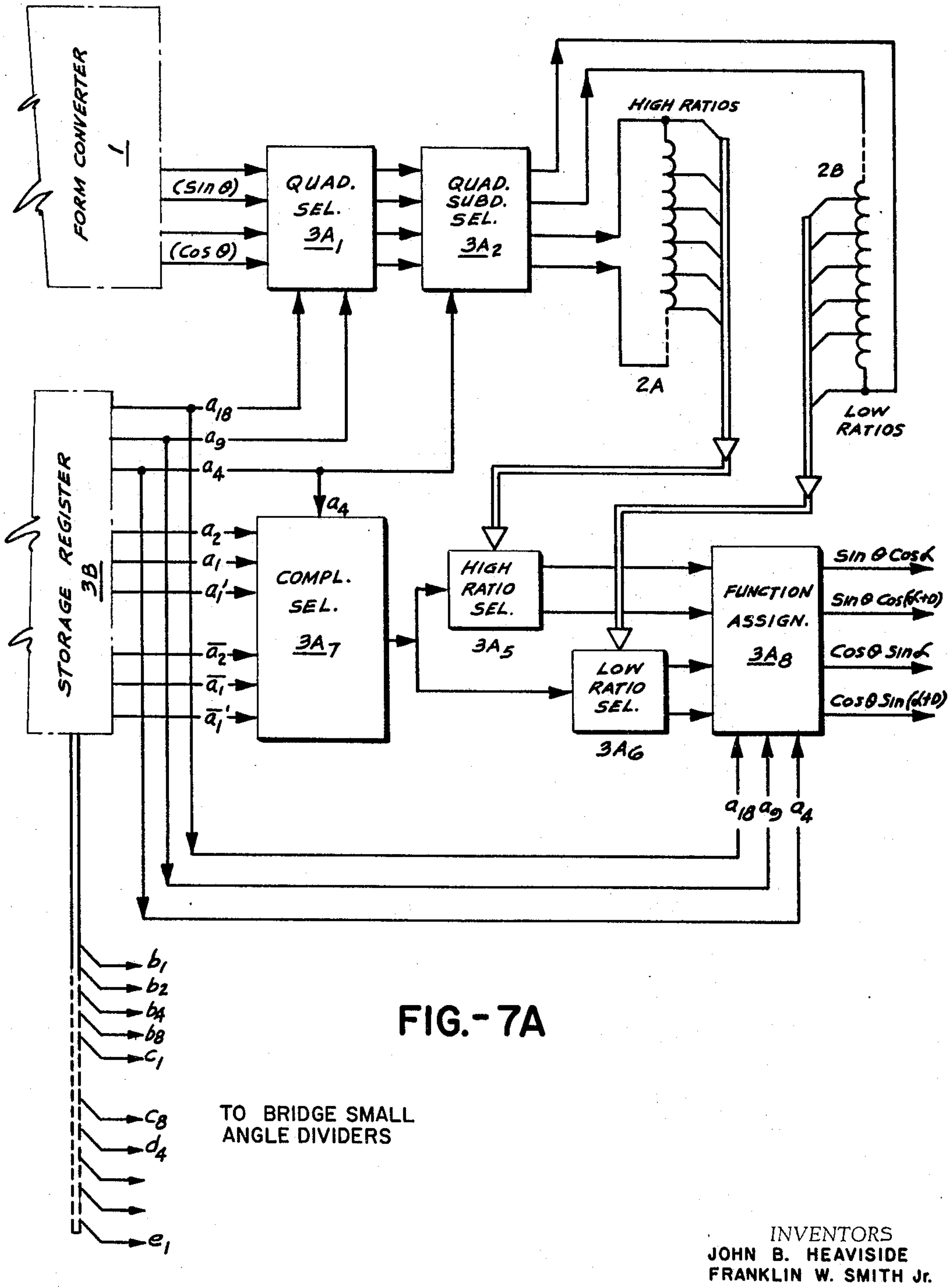

The actual circuit arrangement reflecting the foregoing is shown in FIGURE 7A which is described below.

The circuit of FIGURE 7A primarily illustrates components of the bridge switching system 3A but also illustrates a portion of the storage register 3B and the bridge transformers 2A and 2B.

As described hereinbefore, the input data is received from the form converter 1. This data is switched in a quadrant selector circuit $3A_1$ in dependence upon the half-revolution and quadrant involved; this is done by means of the control inputs $a_{18}$ and $a_9$ which represent $\alpha_1$ and $\alpha_2$ [i.e., 180° and 90°]. Illustratively, the quadrant selector will comprise a group of relays for effecting the necessary polarity reversals in the sine $\theta$ and cosine $\theta$ inputs.

The outputs of the quadrant selector are fed to a quadrant sub-division selector $3A_2$ which is controlled by input $a_4$. This input represents 40° trial angle and it indicates whether the trial angle is in the first or second quadrant subdivision (see Table I and the previous example, *supra*). Based upon the states of the two selector systems, $3A_1$ and $3A_2$, the input voltages are assigned to either the high ratio taps of the transformer 2A or the low ratio taps of the transformer 2B. Selector $3A_2$ is an appropriate relay combination in the illustrated embodiment.

Selection of a particular tap in the high ratio and low ratio range is controlled by high ratio and low ratio selector systems $3A_5$ and $3A_6$ respectively. These systems typically comprise relay tree arrangements which have relay contacts connected to the taps on 2A and 2B. The relay fields are selectively energized to activate a particular tap in accordance with the output from a complement selector $3A_7$. This selector comprises a relay group which feeds either the basic 20, 10, 10' data $a_2$, $a_1$, $a_1'$ or the complement, $\overline{a_2}$, $\overline{a_1}$, $\overline{a_1'}$, to the ratio selectors in dependence upon whether the trial angle is in the first or second quadrant sub-division. Hence the selector $3A_7$ receives the sub-division indicator $a_4$ as an additional control input.

Once the particular taps have been selected they are allocated to the four function lines of the bridge by a function assignment system, $3A_8$. This system illustratively employs a relay matrix which is controlled by the half revolution, quadrant and quadrant sub-division signals, $a_{18}$, $a_9$ and $a_4$. Thus, the input dividers of the bridge are adjusted to the particular 10° angle value dictated by the control system. In addition the storage register supplies the necessary code switching via lines $b_1$, $b_2$, $b_4$, $b_8$, $c_1$, $c_2$ . . . $d_4$, $d_8$, $e_1$, to the remaining bridge dividers.

Figure 7B:
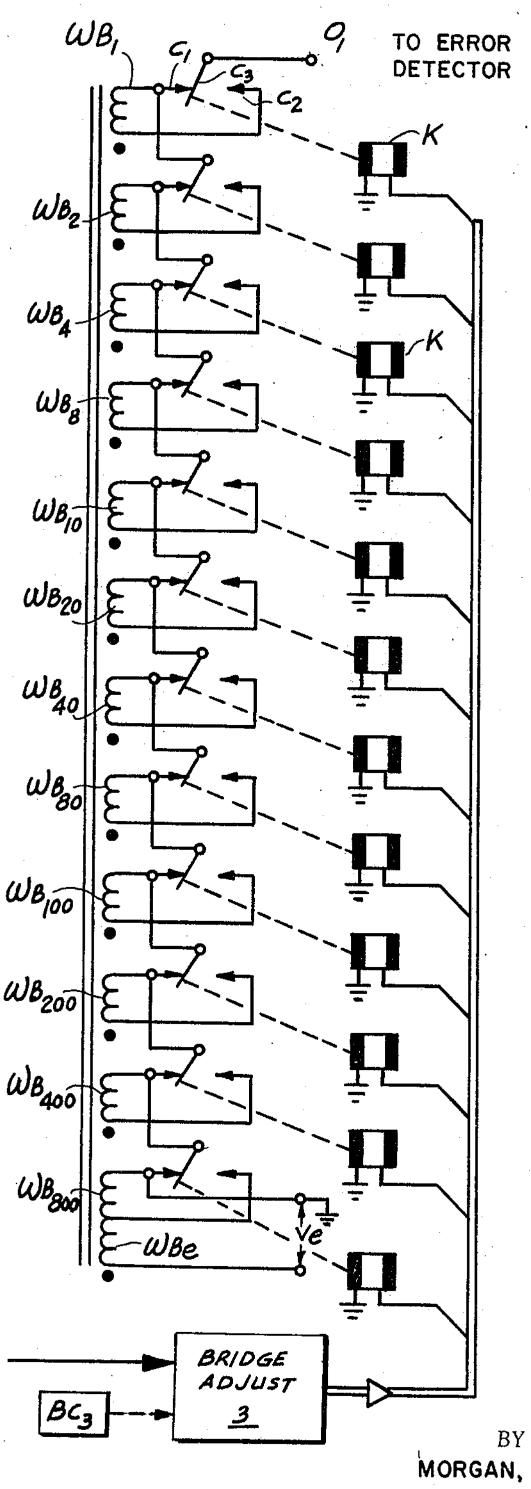

In FIGURE 7B there is illustrated a divider control arrangement based upon a binary coded decimal system which may be utilized for the interpolating or ratiometric dividers employed in the bridge, e.g., for the degree, tenths, and hundredths value of $\alpha_1$. The system illustratively comprises a series of individual windings on a common core. A first decade section comprises windings $WB_1$, $WB_2$, $WB_4$ and $WB_8$. The end of each winding is connected to respective fixed contacts $C_1$ and $C_2$ of a switching assembly having movable contact $C_3$. The movable contact associated with winding $WB_1$ is connected to output terminal $O_1$ which ultimately supplies the null detector, illustratively via a final divider which may be a potentiometer or additional inductive divider. The fixed contact $C_1$ of $WB_1$ is connected to the movable contact $C_3$ of $WB_2$. Similarly, the fixed contact $C_1$ of $WB_2$ is connected to the movable contact of $WB_4$. This arrangement is carried forward to $WB_8$. The fixed contact $C_1$ of the latter connects to the movable contact $C_3$ of a second decade section comprising four windings $WB_{10}$, $WB_{20}$, $WB_{40}$ and $WB_{80}$. These windings are interconnected in the pattern described above with the fixed contact $C_1$ of $WB_{80}$ being connected to the movable contact $C_3$ of a switch assembly allocated to $WB_{100}$. This winding together with windings $WB_{200}$, $WB_{400}$ and $WB_{800}$ constitute the third transformer section and the above-described technique is carried forward through this section.

The relative turns ratios of the individual windings is indicated by the subscript associated with each winding. It may be seen that the code is a decaded binary type.

In series connection with $WB_{800}$ is an additional winding $WB_e$; across this combination an excitation voltage $V_e$ is supplied which in general will be related to the selected more significant increment.

Each of the switch assemblies associated with one of the windings is operated by an associated relay K and the relays are controlled from the bridge switching circuits 3A of the adjusting system 6 in accordance with the procedure hereinbefore described.

Set forth below is Table IV which indicates the switching logic employed in the illustrated automatic bridge system:

TABLE IV

| | 18 | 9 | 4 | 2 | 1 | 1′ | | 18 | 9 | 4 | 2 | 1 | 1′ |
|---|---|---|---|---|---|---|---|---|---|---|---|---|---|
| 00 | 0 | 0 | 0 | 0 | 0 | 0 | 18 | 1 | 0 | 0 | 0 | 0 | 0 |
| 01 | 0 | 0 | 0 | 0 | 1 | 0 | 19 | 1 | 0 | 0 | 0 | 1 | 0 |
| 02 | 0 | 0 | 0 | 1 | 0 | 0 | 20 | 1 | 0 | 0 | 1 | 0 | 0 |
| 03 | 0 | 0 | 0 | 1 | 1 | 0 | 21 | 1 | 0 | 0 | 1 | 1 | 0 |
| 04 | 0 | 0 | 1 | 0 | 0 | 0 | 22 | 1 | 0 | 1 | 0 | 0 | 0 |
| 05 | 0 | 0 | 1 | 0 | 0 | 1 | 23 | 1 | 0 | 1 | 0 | 0 | 1 |
| 06 | 0 | 0 | 1 | 0 | 1 | 1 | 24 | 1 | 0 | 1 | 0 | 1 | 1 |
| 07 | 0 | 0 | 1 | 1 | 0 | 1 | 25 | 1 | 0 | 1 | 1 | 0 | 1 |
| 08 | 0 | 0 | 1 | 1 | 1 | 1 | 26 | 1 | 0 | 1 | 1 | 1 | 1 |
| 09 | 0 | 1 | 0 | 0 | 0 | 0 | 27 | 1 | 1 | 0 | 0 | 0 | 0 |
| 10 | 0 | 1 | 0 | 0 | 1 | 0 | 28 | 1 | 1 | 0 | 0 | 1 | 0 |
| 11 | 0 | 1 | 0 | 1 | 0 | 0 | 29 | 1 | 1 | 0 | 1 | 0 | 0 |
| 12 | 0 | 1 | 0 | 1 | 1 | 0 | 30 | 1 | 1 | 0 | 1 | 1 | 0 |
| 13 | 0 | 1 | 1 | 0 | 0 | 0 | 31 | 1 | 1 | 1 | 0 | 0 | 0 |
| 14 | 0 | 1 | 1 | 0 | 0 | 1 | 32 | 1 | 1 | 1 | 0 | 0 | 1 |
| 15 | 0 | 1 | 1 | 0 | 1 | 1 | 33 | 1 | 1 | 1 | 0 | 1 | 1 |
| 16 | 0 | 1 | 1 | 1 | 0 | 1 | 34 | 1 | 1 | 1 | 1 | 0 | 1 |
| 17 | 0 | 1 | 1 | 1 | 1 | 1 | 35 | 1 | 1 | 1 | 1 | 1 | 1 |

Figure 7C:
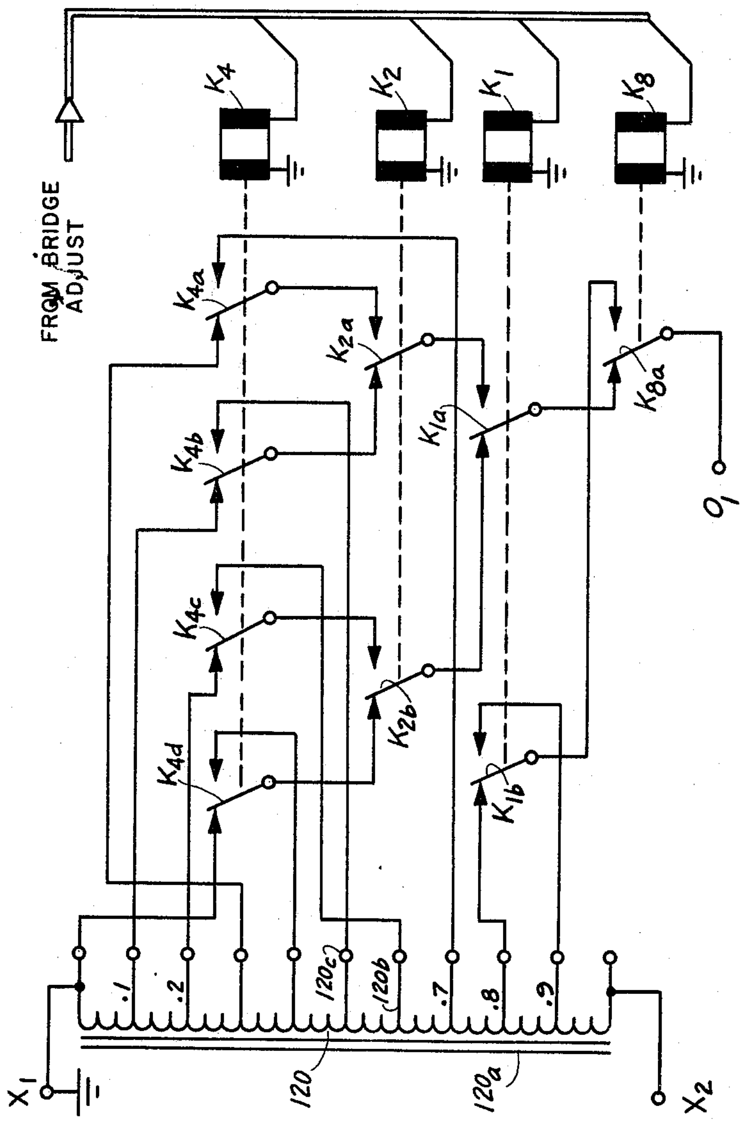

An alternate or supplementary bridge switching arrangement involving only one decade is shown in FIGURE 7C. This arrangement employs an inductive divider 120 having a common core **120*a*. The winding 120 is energized via terminals $X_1$ and $X_2$ connected to the ends of the winding and is divided into ten equal increments by virtue of taps 120*b***. This is in contrast with the binary coded decade arrangement of FIGURE 7B.

The arrangement includes a relay tree of four relays $K_1$, $K_2$, $K_4$ and $K_8$ with their associated switching assemblies and it may be seen by tracing the circuits that various ratios are attainable according to the combination of relays which is operative at a particular time. For example, with relays $K_1$ and $K_8$ energized the output terminal $O_1$ is connected to the 0.9 tap of winding 120; with $K_8$ alone energized the output is connected to the 0.8 tap. Similarly, with $K_1$ and $K_4$ energized, output terminal $O_1$ is connected to the 0.5 tap. It may be seen that the subscript in the relay designation indicates the contribution of that relay to the overall ratio and that the relays are interconnected and switched according to the binary code.

SIMULATORS AND SIMULATOR-CONVERTER SYSTEMS

Figure 5:
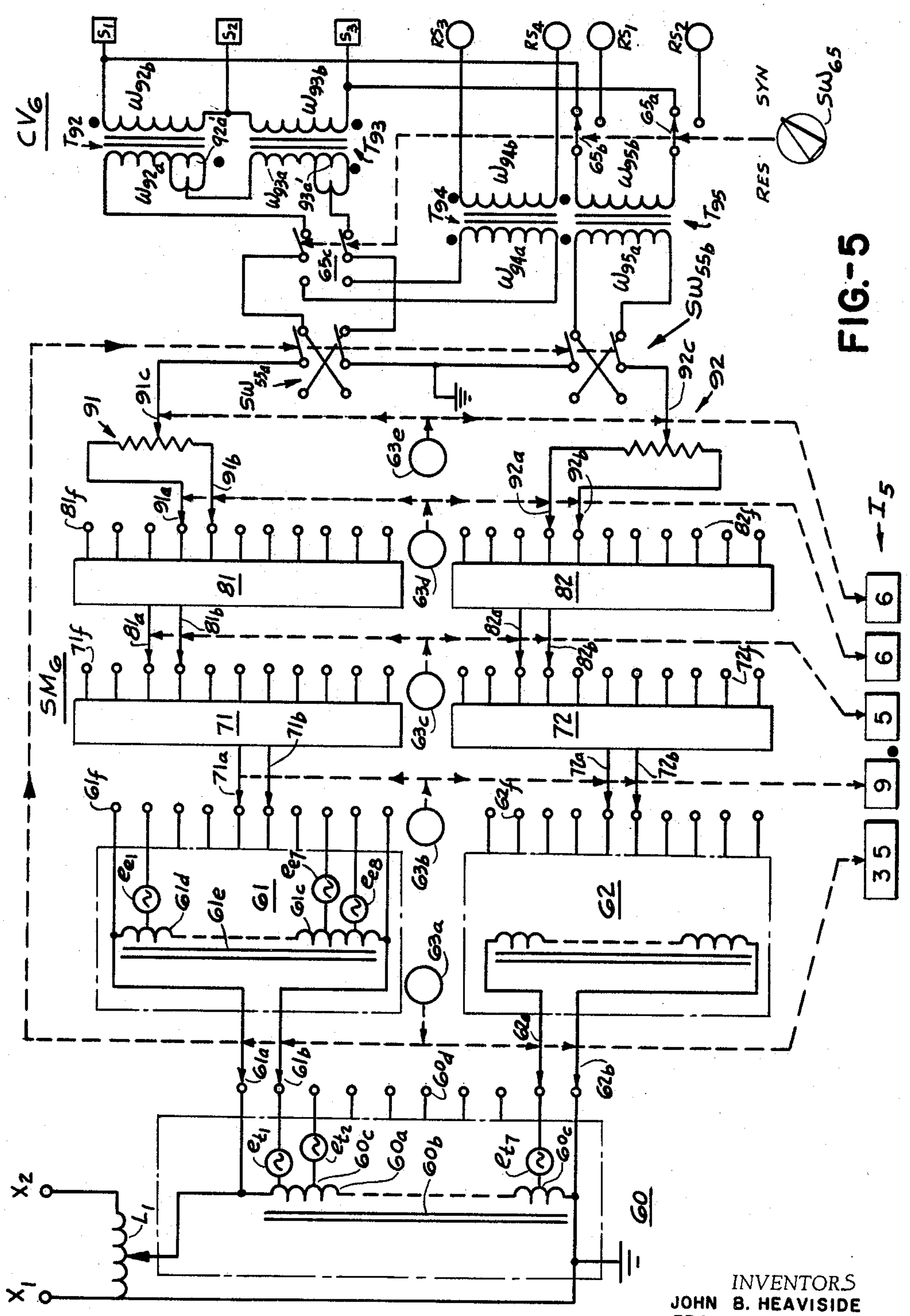
FIGURE 5 is a schematic diagram illustrating in greater detail a simulator and converter/isolator.

The general organization of simulator components has been described hereinbefore in connection with FIGURE 4. A more detailed illustration is provided in FIGURE 5. The simulator arrangement shown therein comprises a resolver type simulator $SM_6$ which provides resolver voltages variable according to the angle set into the simulator. These voltages are coupled to an output circuit or converted into equivalent synchro voltages prior to the output circuit by means of form converter $CV_6$. In the "resolver" mode the converter functions to provide isolation between the simulator and the output terminals $RS_1$, $RS_2$, $RS_3$ and $RS_4$. In the "synchro" mode the converter transforms the voltages and supplies the equivalent synchro data at output terminals $S_1$, $S_2$, $S_3$.

The simulator includes an excitation circuit having terminals $X_1$, $X_2$ energized by an AC voltage. Connected across the terminals is a variable ratio transformer $L_1$ for supplying a variable excitation to a trigonometric divider 60 of the inductive type. Variable inductance $L_1$ permits the establishment of the desired voltage level and may also be used to simulate the transformation ratio of a synchro or resolver.

Trigonometric divider 60 is tapped at 10° intervals to yield the value of the sine function for the angles 10°, 20°, 30° . . . 90°. Of course, these values conform to the cosine values for the complementary angles.

The distribution on taps **60*c*** of the divider is chosen to approximate the desired sine or cosine of the particular angle and the ratio provided at the tap is refined, preferably by the injection of an appropriate resolution-increasing voltage $e_{t1}$, $e_{t2}$ . . . $e_{t7}$. In an illustrative case the winding distribution of the divider yields the first three significant figures of the sine value and cosine value while the injected voltage adds three additional significant figures thereto. The trimming or resolution-increasing voltage may be obtained according to the means described in connection with the previously described bridge circuits.

Selectively engaging adjacent output taps **60*d* of the divider 60 is a pair of brushes 62*a*, 62*b* connected across a divider 62. This brush pair extracts the tapped sine values from divider 60. An additional pair of brushes 61*a*, 61*b* also selectively contacts the taps 60*d* of divider 60. Brushes 61*a*, 61*b* pick off the cosine values and are spaced from and driven in complementary relationship with respect to the sine brushes. The cosine brushes are connected in turn across the winding of divider 61 which is preferably identical in construction to divider 62**.

The construction of dividers 61 and 62 is based upon the fact that the usual errors attending synchro and resolver simulation for values of $\theta$ which involve interpolation, may be significantly reduced by introducing corrective or compensating voltages in accordance with the error functions hereinbefore described in connection with the bridge systems of the invention [see FIGURE 3C]. It has been found that the introduction of such corrective voltages for each of the ratios provided by dividers 61 and 62 as directed by the error amplitudes plotted in FIGURE 3C at points 0.1D, 0.2D, 0.3D . . . D, significantly reduces the overall error in the ratio between the sine and cosine resolver outputs of the simulator ($f_1$ utilized for $D=10$; $f_2$ for $D=5°$).

In accordance with the foregoing, a corrective voltage $e_{e1}$, $e_{e2}$, etc., proportioned according to the applicable error function is added to the voltage at the associated tap of each of the dividers 61 and 62. These voltages may be added either by adjustment of the tap location or by injection of a voltage such as described in connection with the bridge dividers of FIGURE 3D. The voltages thus modified appear at terminals **61*f*, and 62*f* of the dividers 61 and 62**, respectively.

Interpolation of the output of dividers 61 and 62 may be accomplished by suitable known interpolating techniques employing, for example, cascaded linear decade dividers 71, 81, 91 and 72, 82, 92. Dividers 91 and 92 each illustratively comprise potentiometers yielding the final resolver cosine and sine signals at arms **91*c* and 92*c* thereof. These voltages, suitably polarized according to the operating quadrant by means of switches $SW_{55a}$ and $SW_{55b}$, are applied to the form converter $CV_6$ which is described below. It may be here noted that the simulator is amenable to both local and remote control via the control elements 63*b*, 63*c* . . . 63*e* each allocated to a pair of dividers 61–62, 71–72 . . . 91–92 and control element 63*a* which is allocated to divider 60** and also controls the switching mechanism $SW_{55a}$, $SW_{55b}$. Binary coded switching, FIGURES 7A, 7B, 7C may be employed for this purpose following either a natural binary, a binary coded decimal or a hybrid system. This is also true for bridge control.

The form converter/isolator is switched by mode selector $SW_{65}$ which operates switch sections **65*a*, 65*b*, 65*c***. These switches are interconnected as shown with a group of transformers $T_{92}$, $T_{93}$, $T_{94}$ and $T_{95}$.

The input windings $W_{92a}$ and $W_{93a}$ of $T_{92}$ and $T_{93}$ are connected in series-aiding relationship to switch section **65*c* in such a manner that in the synchro mode of operation this winding combination is energized by the resolver consine voltage; in the resolver mode these windings are deenergized. Winding $W_{95a}$ of transformer $T_{95}$ is energized in both modes of operation by the since resolver voltage. The output winding $W_{95b}$ of $T_{95}$ is connected in the synchro mode of operation to sine output terminals $S_1$ and $S_3$ via switch sections 65$a$ and 65**$b$. Also connected to these output terminals is the series-opposing combination of winding groups $W_{92b}$ and $W_{93b}$. It may be seen that in the synchro mode of operation the output windings of $T_{92}$, $T_{93}$ and $T_{95}$ are in delta configuration and are connected to the synchro output terminals. Note that the junction of the secondary of $T_{92}$ and $T_{93}$ is connected to synchro terminal $S_2$.

In the resolver mode of opeaation the cosine voltage is applied to transformer $T_{94}$ via 65$c$ with the secondary winding $W_{94b}$ supplying a resolver output to terminals $RS_3$ and $RS_4$. Similarly, the output of transformer $T_{95}$, which is energized by the sine voltage, is switched in the resolver mode to supply the sine component at output terminals $RS_1$and $RS_2$.

$W_{92a}/W_{92b}$ (overall)$=(\sqrt{3}/3)/1$ $W_{93a}/W_{93b}$ (overall)$=(\sqrt{3}/3)/1$ $W_{94a}/W_{94b}=1:1$ $W_{95a}/W_{95b}=1:1$ An analysis of the foregoing simulator arrangement will show that substantially balanced impedence conditions prevail in both the sine and consine channels. It should also be noted that impendence values minimize loading.

Figure 6:
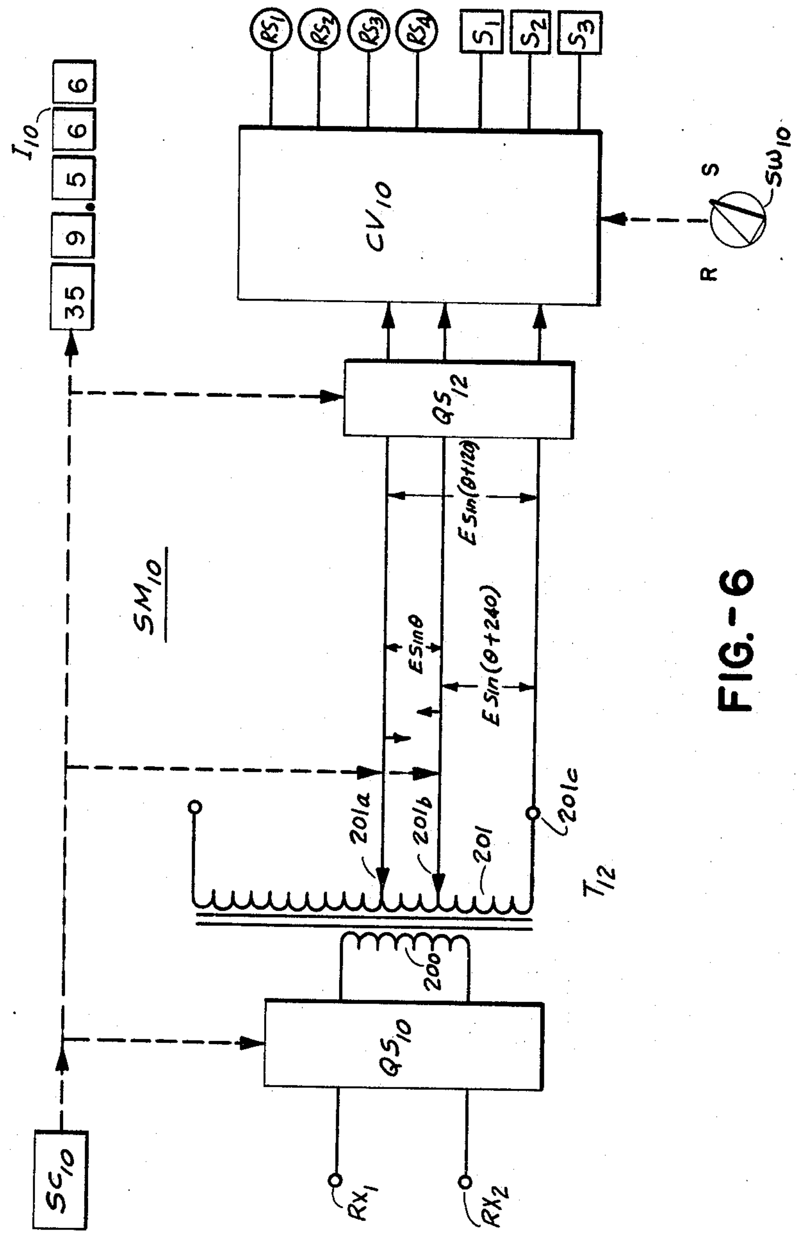
FIGURE 6 is a schematic diagram of a simulator employing a synchro type simulator and a converter/isolator.

FIGURE 6 illustrates a synchro type simulator $SM_{10}$ supplying synchro data to a form converter $CV_{10}$ which couples the synchro data to output terminals $S_1$, $S_2$, $S_3$ in one mode and converts the data to equivalent resolver data in the other mode. The resolver data is coupled to output terminals $RS_1$–$RS_4$. The form converter may be any one of the types hereinbefore described for converting synchro voltages to equivalent resolver voltages.

The simulator comprises a transformer $T_{12}$ having a primary winding 200 energized from excitation applied to terminals $RX_1$, $RX_2$ with the excitation being polarized by quadrant switching circuits $QS_{10}$ at 60° intervals as established by the particular angle input applied to the simulator from control $SC_{10}$.

Transformer $T_{12}$ includes a secondary winding 201 having brushes 201$a$ and 201$b$ driven in opposite directions by the angle adjustment control $SC_{10}$ in such a manner that a sine $\theta$ voltage appears between the brushes while sine $[\theta+120]$ and sine $[\theta+240]$ voltages appear between each brush and the end 201$c$ of the secondary winding respectively. These voltages are suitably switched in known manner at 60° intervals by means of quadrant switching circuits $QS_{12}$ which are driven from the angle set control $SC_{10}$. The output of $QS_{12}$ is fed to the form converter. The applied angle is indicated by display means $I_{10}$.

The invention is not limited to the specific mechanisms and techniques herein shown and described since modifications will undoubtedly occur to those skilled in the art. Hence departures may be made from the invention without sacrificing its chief advantages.

What is claimed is:

1. Bridge apparatus comprising first and second computing means respectively energized by inputs representing data related to complementary trigonometric functions, each of angular data $\theta$ and magnitude R, means actuating said first and second computing means respectively in accordance with adjusting complementary trigonometric functions of angular data $\alpha$ to establish said function of $\alpha$ in said first and second computing means, means responsive to said first and second computing means for deriving a first signal which is a function of $(\theta-\alpha)$ and the magnitude R, means responsive to said first and second computing means, for deriving a second signal which is approximately proportioned to said magnitude R, and combining means for combining said first and second signals, said combining means including detecting means for detecting the relationship between said first and second signals to compute $\theta-\alpha$ and thereby obtain data indicative of $\theta$.

2. Apparatus according to claim 1 in which said first and second computing means comprise trigonometric ratio dividers, said first signal deriving means comprise summing means and said combining means are connected to be responsive to said summing means for computing said ratio to thereby determine $(\theta-\alpha)$.

3. Apparatus according to claim 1 in which said combining means include compensated ratio computing means adjusted in accordance with a function of a trial angle within the range $(\theta-\alpha)$ to compute said ratio.

4. The apparatus according to claim 1 in which said angular data $\alpha$ comprises a coarse trial angle $\alpha_1$, in which said first and second computing means include circuits for computing respective voltages $e_{11}$ and $e_{22}$ related respectively to sin $\theta$ cos $\alpha_1$ and cos $\theta$ sin $\alpha_1$, and also generate respective voltages $e_3$ and $e_4$ related respectively to sin $\theta$ $\cos(\alpha_1+D)$ and cos $\theta$ $\sin(\alpha_1+D)$, where D is a displacement of constant value from $\alpha_1$, and in which said first signal deriving means include first summing means for combining $e_{22}$ and $e_{11}$ to obtain a voltage $e_a$, said second signal deriving means include second summing means for combining $e_3$ and $e_4$ to obtain a voltage $e_b$, and third summing means for combining $e_a$ and $e_b$ to obtain a voltage $e_r$, and wherein said first and second signals comprise the voltages $e_a$ and $e_r$.

5. Apparatus according to claim 1 including feedback means interconnecting said first and second computing means and said combining means for automatically adjusting said bridge apparatus to a predetermined condition reflecting the value of said angular data $\theta$.

6. Apparatus according to claim 1 in which said first and second computing means comprise divider means each with a plurality of taps defining sine/cosine functions of $\alpha_1$ and a constant displacement D from $\alpha_1$, where $\alpha_1$ comprises a course trial angle and said signal deriving and combining means comprise: summing means connected to the selected taps of said divider means, ratiometric means responsive to said summing means and to means generating data representing $(\theta-\alpha)$, and read-out indicating means controlled in accordance with said ratiometric means.

7. Apparatus according to claim 1 in which said angular data $\alpha$ comprises a coarse trial angle $\alpha_1$, said first and second computing means include circuits for generating respective voltages $e_{11}$ and $e_{22}$ which voltages include, respectively, the factors sin $\theta$ cos $\alpha_1$ and cos $\theta$ sin $\alpha_1$ and for generating voltages $e_3$ and $e_4$, which voltages include, respectively, the factors sin $\theta$ cos $(\alpha_1+D)$ and cos $\theta$ sin $(\alpha_1+D)$ where D is a displacement of constant value from $\alpha_1$; in which said first signal deriving means include first summing means for combining $e_{11}$ and $e_{22}$ to obtain said first signal; and in which said second signal deriving means include summing circuits for desriving said second signal.

8. Apparatus according to claim 1 including a synchro-to-resolver converter means coupled to the input of said first and second computing means for processing said angular data $\theta$ when $\theta$ is represented in synchro form.

9. Apparatus according to claim 8 in which said converter means include connection forming means for selectively activating and deactivating said converter means to process synchro data in one state and resolver data in another state.

10. Apparatus according to claim 9 including feedback means for automatically adjusting said computing means.

11. Apparatus according to claim 1 in which said first and second signals are derived such that said data indicative of angular data $\theta$ includes an error, in which said actuating means includes switching means for generating data representing a coarse trial angle $\alpha_1$, and in which said error is independent of the null value of $\alpha_1$.

12. Apparatus according to claim 11 in which said combining means include means for compensating for said error.

13. Apparatus according to claim 12 in which said compensated combining means include linear dividers and compensation circuits connected thereto for obtaining said data indicative of $\theta$ within an accuracy of about several seconds of arc.

14. Apparatus according to claim 11 in which said error varies from zero through alternate polarities back to zero over a constant interval of said data range $(\theta-\alpha)$.

15. Apparatus according to claim 14 including compensating means connected to modify at least one of said signals for compensating for said error.

16. Bridge apparatus adjustable to a condition indicative of input angular data $\theta$ comprising computing means energized by inputs representing data related to a first trigonometric function $F_1$ of amplitude R and angular data $\theta$ and a complementary function $F_2$ thereof, coarse trial angle data generating means, said data generating means being connected to said computing means for actuating said computing means in accordance with the generated trial angle data $\alpha_1$ at said indicating condition, signal deriving means responsive to said computing means for deriving two signals $e_1$ and $e_2$, said signals having characteristics such that their ratio is related to the difference $\Delta\alpha$ between said input angular data $\theta$ and the coarse angle data $\alpha_1$, said ratio being independent of R and $\alpha_1$, means adjusted to generate fine trial angle data, interpolating means energizing by said signal $e_2$ and actuated by said fine trial angle data generating means for developing a third signal $e_3$, means for combining the signals $e_1$ and $e_3$ to yield at said indicating condition, a signal condition indicating substantial proportionality between $\Delta\alpha$ and said fine trial angle data.

17. Apparatus according to claim 16 including means interconnecting said combining means and said coarse and fine trial angle generating means for automatically adjusting said generating means to measure $\theta$.

18. Apparatus according to claim 16 in which said interpolating means comprise a linear divider circuit.

19. Apparatus according to claim 16 in which said coarse trial angle generating means include means for generating functions of a coarse trial angle $\alpha_1$ and the trial angle $\alpha_1+D$ where D is a constant representing the coarse trial angle increment.

20. Apparatus according to claim 16 in which said signal $e_1$ is proportional to $R \sin \Delta\alpha$ and said signal $e_2$ is proportional to $R[\sin (D-\Delta\alpha)+ \sin \Delta\alpha]$ where D is the linear interpolation increment.

21. Apparatus according to claim 16 in which said ratio varies non-linearly with respect to the difference angle $\Delta\alpha$, in which said interpolating means includes means for compensating for said non-linearity.

22. Apparatus in accordance with claim 16 including compensating means connected to said interpolating means for computing said angular data $\theta$ within an accuracy of about several seconds of arc.

23. Bridge apparatus according to claim 16 in which said signal deriving means comprise a summing transformer having a plurality of windings connected to develop said signal $e_2$ across a pair of terminals of said transformer and the other of said signals $e_1$ across one of the terminals of said pair and a third terminal thereby mechanizing the calculation of said ratio.

24. Bridge apparatus according to claim 23 in which said interpolating means comprise a tapped divider circuit connected across said pair of terminals and having tap selection means adjusted by said fine trial angle generating means, and measuring means connected between said tap selection means and said third terminal, whereby adjustment of said divider circuit and said coarse trial angle generating means for a null condition, yields said angular data.

25. Bridge apparatus according to claim 24 in which said divider circuit includes compensating means for compensating interpolation error.

26. Bridge apparatus according to claim 24 in which said tapped divider circuit includes compensating means for compensating for interpolation error and cascaded linear interpolating dividers.

27. Apparatus according to claim 16 in which said signals $e_1$ and $e_2$ have characteristics such that their ratio varies non-linearly with respect to the difference angle $\Delta\alpha$, and in which said non-linearity is independent of said trial angle $\alpha_1$.

28. Apparatus according to claim 27 in which said interpolating means include means for compensating for said non-linearity.

29. Apparatus according to claim 27 in which said non-linearity is characterized by an error which varies in polarity over the interpolating interval.

30. Apparatus according to claim 29 in which said interpolating means include means for compensating for said non-linearity.

31. Electronic resolver bridge apparatus for processing input angle data $\theta$ comprising, bridge adjustment means, first and second trigonometric divider means connected to said bridge adjustment means and energized by sinusoidal and cosinusoidal functions of said angle data $\theta$, respectively, each divider means including means for selecting increments of the divider means as a function of cosinusoidal and sinusoidal functions of the actuation of said bridge adjustment means, respectively, first and second interpolating means jointly responsive to said bridge adjustment means and connected respectively to the selected increments of said first and second divider means, said first and second interpolating means including linear interpolators and compensating means modifying said interpolators to compensate for the interpolating error.

32. Apparatus according to claim 31 including a synchro-to-resolver converter connected to the input of said first and second divider means.

33. Apparatus according to claim 31 including null sensing means connected to said interpolating means and means responsive to said null sensing means for indicating the state of said bridge adjustment means when said null ocurrs.

34. Apparatus according to claim 31 in which said interpolating means include inductive dividers having selectable taps and said compensating means comprise means for modifying the voltage appearing at some of said taps.

35. Apparatus according to claim 34 in which said modifying means include means for developing a correction parameter which varies from zero at one end of said increment through a peak, thence through zero at the middle of said increment thence through a peak of opposite polarity and finally to zero at the other end of the increment.

36. Electronic resolver bridge apparatus comprising computing means energized by inputs representing data related to a first trigonometric function of amplitude R and angular data $\theta$ and a complementary function thereof, means actuating said computing means in accordance with trigonometric functions of a coarse adjustment angle $\alpha_1$ established to measure said data $\theta$, and deriving means responsive to said computing means for deriving two signals, having characteristics such that their ratio is a function of factors including the sine of the difference $(\theta-\alpha_1)$ between said input angular data $\theta$ and said adjustment angle $\alpha_1$, means for generating a nulling fine trial angle, and means responsive to said fine trial angle generating means for modifying at least one of said two signals by said fine angle generating means to achieve a null condition such that in a null condition, said coarse and fine trial angles indicate said input angular data $\theta$.

37. Apparatus according to claim 36 in which said actuating means and fine trial angle generating means include inputs adapted to receive external programming signals related to command angle data, said apparatus further including output means responsive to said deriving means for indicating the relationship between $\theta$ and said command angle data.

38. Apparatus according to claim 36 which includes an automatic feedback circuit interconnecting said signal deriving means and said actuating means and said generating means.

39. Apparatus according to claim 36 in which said two signals have characteristics such that said ratio function is the reciprocal of $[\sin(D-\Delta\alpha)/\sin\Delta\alpha]+1$ where D is a constant related to said computing means and $\Delta\alpha$ is said difference $(\theta-\alpha_1)$ between input angular data and adjustment angle.

40. Apparatus according to claim 39 in which said deriving means includes means for generating a correction factor related to the difference between said ratio function and a substantially linear function of $\Delta\alpha[\Delta\alpha/D]$.

41. Apparatus according to claim 40 in which said deriving means includes null sensing means for indicating correspondence between the value of total coarse and fine trial angles and $\theta$ when said ratio is computed.

42. Apparatus according to claim 40 including a synchro-to-resolver converter connected to the input of said computing means for converting synchro data to said trigonometric function inputs.

43. Electronic resolver bridge apparatus comprising first and second tapped dividers respectively energized by coordinate sine and cosine functions of input angle $\theta$, tap selection means connected to said tapped dividers and adjustable in accordance with the cosine and sine of bridge coarse adjustment angle $\alpha_1$ for selecting a pair of taps of each divider, the taps defining increment D, a first transformer having a primary connected to be actuated from one selected tap of one divider and the corresponding selected tap of the other divider, a second transformer having a primary connected to be actuated from the remaining selected taps, said transformers each having a secondary mutually interconnected to a common terminal, compensated interpolating divider having interpolation error compensating means, said compensated divider being connected to said transformer secondaries and having a plurality of pairs of taps selected as a function of a fine adjustment angle, linear interpolating divider means connected to said compensated interpolating divider taps, and null sensing means connected between said linear divider means and said common terminal.

44. Bridge apparatus according to claim 43 in which said compensating means comprise voltage varying means for varying the ratios of selected taps of said compensated interpolating divider.

45. Bridge apparatus according to claim 43 including means responsive to said null sensing means for automatically indicating angle $\theta$ when a null occurs.

46. Function generating apparatus for generating rotary angle data represented by a set of AC signals in synchro form and resolver form comprising a function generator output circuit, simulator means for generating simulator signals in one of said forms and having divider means, means for adjusting said divider means in accordance with the rotary angle data to be generated, and a simulator output circuit, dual mode switchable converter means connected to said simulator output circuit, operable in one mode to convert said simulator signals in said one form to signals of the other form, and operable in another mode of couple said simulator signals to said function generator output circuit without conversion, said converter means including a plurality of transformers and switching means, said switching means having one set of connections operable in said first mode for interconnecting said transformers to convert said simulator signals to said other form and to couple same to said function generator output circuit and having a second set of connections operable in said other mode for interconnecting said transformers as an isolating circuit to couple said simulator signals to said function generator output circuit without form conversion.

47. Apparatus according to claim 46 in which said simulator means generate signals in resolver form and said converter means are operable to convert said signals to synchro form.

48. Apparatus according to claim 46 in which said simulator means generate signals in synchro form and said converter means are operable to connect said signals in synchro form to signals in resolver form.

49. Apparatus according to claim 46 in which said divider means include resolution increasing means.

50. Apparatus according to claim 46 in which said divider means include an inductive divider having means for simultaneously generating two complementary functions and means for generating interpolated values of said functions.

51. Static trigonometric form converter means adapted to the processing of rotary angle data in the form of synchro signals and resolver signals for converting signals of one of said forms to signals of the other form in one mode, and for transmitting without conversion in another mode comprising a plurality of transformers each having at least one synchro circuit winding and one resolver circuit winding of predetermined turns ratio and phasing, synchro circuit means including said synchro windings and synchro terminals connected to said synchro windings for the transmission of data in said synchro form, resolver circuit means including said resolver windings and resolver terminals connected to said resolver windings for the transmission of data in said resolver form, said synchro and resolver windings being interposed between said synchro and resolver terminals and having phasing and turns ratios such that conversion obtains between said synchro and said resolver signals, and circuit changing means connected to at least one of said circuit means for by-passing said conversion while transmitting signals of one of said forms.

52. Apparatus according to claim 51 in which said circuit changing means comprise means for changing said turns ratios from values providing said conversion to values providing transmission with isolation and without conversion.

53. Apparatus according to claim 51 in which said circuit-changing means comprise taps on some of said windings and switch means for activating said taps in accordance with the mode of operation.

54. Apparatus according to claim 51 in which said circuit changing means include switch means having at least two states for providing transmission with isolation in one mode and conversion with isolation in another mode.

55. Static trigonometric form converter means adapted to the processing of rotary angle data in the form of synchro signals and resolver signals for converting signals of one of said forms to signals of the other form comprising a plurality of transformers each having at least one synchro circuit winding and resolver circuit winding of predetermined phasing and turns ratio, synchro circuit means including said synchro windings and synchro terminals connected thereto for the transmission of data in said synchro form, resolver circuit means including said resolver windings and resolver terminals connected thereto for the transmission of data in said resolver form, said synchro and resolver windings being interposed between said synchro and resolver terminals and having phasing and a plurality of selectable transformation ratios such that conversion obtains between said synchro and resolver signals for certain selected transformation ratios.

56. Apparatus according to claim 55 in which said windings, turns ratios and phasing have values for giving said converter means bilateral transmission properties.

57. Apparatus according to claim 55 in which said certain ratios of said windings have values for converting synchro signals to resolver signals.

58. Apparatus according to claim 55 in which said certain ratios of said windings have values for converting resolver signals to synchro signals.

59. Apparatus according to claim 55 including switch means for selecting in one mode certain of said selectable ratios for providing said conversion and in another mode other transformation ratios for providing transmission without conversion.

60. Apparatus according to claim 59 in which the transformation ratios of said windings in both modes are the same.

61. Computing apparatus for generating signals as a function of values of a variable including values of angular minutes comprising tapped hexade divider means having an input for receiving signals representing degree values of said variable, said hexade divider means having incremental sections for generating signals representing ten minute increments of said variable and having an output for supplying said signals, and decade divider means having an input interconnected with the output of said hexade means to be responsive thereto, said decade divider means having incremental sections for generating minute increments of said variable and an output for supplying said minute increments.

62. Apparatus according to claim 61 including further decade divider means interconnected with the output of said decade divider means for generating signals representing fractional minute increments of said variable.

63. Apparatus according to claim 61 including further hexade divider means having an input interconnected with and responsive to the output of said decade divider means, having incremental sections for generating signals representing ten second increments of said variable and having an output for supplying said signals.

64. Apparatus according to claim 63 including additional decade divider means interconnected with and responsive to the output of said further hexade divider means for generating signals representing increments of said variable in seconds.

References Cited

UNITED STATES PATENTS

| | | | |
|---|---|---|---|
| 2,817,078 | 12/1957 | Pfeiffer | 340—347 |
| 2,849,668 | 8/1958 | Tripp | 318—28 |
| 2,967,017 | 1/1961 | Tripp | 235—197 X |
| 3,025,442 | 3/1962 | Wolff | 235—186 X |
| 3,042,307 | 7/1962 | Booth et al. | 235—186 |
| 3,100,865 | 8/1963 | Nielsen | 323—43.5 |
| 3,177,423 | 4/1965 | Fuldner | 323—43.5 |
| 3,179,875 | 4/1965 | Keats | 323—43.5 |
| 2,866,597 | 12/1958 | Tripp | 235—189 |
| 3,071,324 | 1/1963 | Schroeder et al. | 235—186 X |
| 3,117,222 | 1/1964 | Zdan | 235—189 |
| 3,147,473 | 9/1964 | Ujejski | 340—347 |
| 3,158,738 | 11/1964 | Pfeiffer | 235—186 |
| 3,179,877 | 4/1965 | Godet | 235—189 |
| 3,205,492 | 9/1965 | Young et al. | 340—345 |
| 3,255,448 | 6/1966 | Sadvary et al. | 340—347 |
| 3,277,461 | 10/1966 | Selvin | 340—347 |

MALCOLM A. MORRISON, Primary Examiner

F. D. GRUBER, Assistant Examiner

U.S. Cl. X.R.

235—184, 186, 189; 323—43.5